(12) United States Patent
Parshionikar

(10) Patent No.: US 9,785,242 B2
(45) Date of Patent: Oct. 10, 2017

(54) MULTIPURPOSE CONTROLLERS AND METHODS

(71) Applicant: Uday Parshionikar, Mason, OH (US)

(72) Inventor: Uday Parshionikar, Mason, OH (US)

( * ) Notice: Subject to any disclaimer, the term of this patent is extended or adjusted under 35 U.S.C. 154(b) by 547 days.

(21) Appl. No.: 14/054,789

(22) Filed: Oct. 15, 2013

(65) Prior Publication Data
US 2014/0078049 A1 Mar. 20, 2014

Related U.S. Application Data

(63) Continuation-in-part of application No. 13/418,331, filed on Mar. 12, 2012, now Pat. No. 9,013,264.

(60) Provisional application No. 61/713,760, filed on Oct. 15, 2012, provisional application No. 61/753,204, filed on Jan. 16, 2013, provisional application No. 61/452,086, filed on Mar. 12, 2011, provisional application No. 61/552,124, filed on Oct. 27, 2011, provisional application No. 61/603,947, filed on Feb. 28, 2012.

(51) Int. Cl.
*G09G 5/00* (2006.01)
*G06F 3/01* (2006.01)
*G06K 9/00* (2006.01)
*G08B 21/06* (2006.01)

(52) U.S. Cl.
CPC ......... *G06F 3/017* (2013.01); *G06K 9/00315* (2013.01); *G06K 9/00604* (2013.01); *G06K 9/00671* (2013.01); *G08B 21/06* (2013.01)

(58) Field of Classification Search
CPC .......... G02B 2027/0178; G02B 27/017; G06F 3/017
USPC ......................................... 345/8, 156; 349/11
See application file for complete search history.

(56) References Cited

U.S. PATENT DOCUMENTS

| | | | |
|---|---|---|---|
| 2005/0047662 A1* | 3/2005 | Gorodnichy | G06T 7/2053 382/218 |
| 2011/0018862 A1* | 1/2011 | Epps | G06T 13/40 345/419 |

OTHER PUBLICATIONS

Lart Larry, "uMouse (versions 1.1)", http://web.archive.org/web/20120105050319/http://larryo.org/work/information/umouse/, http://larryo.org/work/information/umouse/, Jan. 2012, 8 pages.
Gruebler et al., "A Wearable Interface for Reading Facial Expressions Based on Bioelectrical Signals", International Conference on Kansei Engineering and Emotion Research, Mar. 2-4, 2010, 10 pages.

(Continued)

*Primary Examiner* — Jennifer Nguyen
(74) *Attorney, Agent, or Firm* — Taft Stettinius & Hollister LLP; Anthony P. Filomena, II

(57) ABSTRACT

Method and apparatus is disclosed for a user to communicate with an electronic device. A processor receives user intention actions comprising facial expression (FE) information indicative of facial expressions and body information indicative of motion or position of one or more body parts of the user. When the FE or body information crosses a first level, the processor starts generating first signals based on the FE or body information to communicate with the electronic device. When the FE or body information crosses a second level, the processor can end generation of the first signals or modify the first signals. An image processing or eye gaze tracking system can provide some FE information or body information. The signals can modify attributes of an object of interest.

60 Claims, 29 Drawing Sheets

(56) References Cited

OTHER PUBLICATIONS

Skovsgaard et al., "Computer Control by Gaze", Chapter 9 of Book "Gaze Interaction and Applications of Eye Tracking", Medical Information Science Reference, Hershey, PA, USA, 2012, 25 pages.

Wilson et al., "FlowMouse—A Computer Vision-Based Pointing and Gesture Input Device", Proceedings of IFIP International Conference on Human-Computer Interaction (Rome, Italy, Sep. 12-16, 2005). INTERACT 2005. Springer, Berlin, 14 pages.

Ellis et al., "Hands-off Cursor Control", http://dip.sun.ac.za/~herbst/cursor_control.html, Feb. 24, 2011, 2 pages.

Morency et al., "Head Gesture Recognition in Intelligent Interfaces: The Role of Context in Improving Recognition", IUI'06, Jan. 29-Feb. 1, 2006, Sydney, Australia, 7 pages.

Chen et al., "Human-Computer Interaction for Smart Environment Applications Using Hand-Gestures and Facial Expressions", http://www.site.uottawa.ca/~petriu/IJMAC-HandGestureFaceExpression.pdf, 21 pages.

Kerns, "Hands-Free Mouse, Use your head instead of your hands!", http://makezine.com/projects/hands-free-mouse/, http://makezine.com/projects/hands-free-mouse/, Dec. 2012, 9 pages.

Bi, "Minnesota college student invents hands-free mouse", http://www.mprnews.org/story/2010/09/19/student-invention, The Minnesota Daily, Sep. 19, 2010, 5 pages.

Deniz, "Mirroring facial expressions in Virtual Humans—Empathic Avatars", http://web.archive.org/web/20120629045337/http://www.evil.eu/evilsolutions/empathicavatars.html, Jun. 29, 2012, 5 pages.

Morency et al., "The Role of Context in Head Gesture Recognition (Morency)", Artificial Intelligence vol. 171, Issues 8-9, Jun. 2007, 4 pages.

Francone et al., "Using the User's Point of View for Interaction on Mobile Devices", Conference Proceedings of IHM'11, the 23th ACM International Conference of the Association Francophone d'Interaction Homme-Machine, ACM New York, NY, USA, (Nice, Oct. 2011), 9 pages.

\* cited by examiner

MULTIPURPOSE CONTROLLERS AND METHODS

CROSS REFERENCE TO RELATED APPLICATIONS

This application is a continuation-in-part of U.S. patent application Ser. No. 13/418,331 filed Mar. 12, 2012 entitled "Multipurpose Controller for Electronic Devices, Facial Expressions Management and Drowsiness Detection", which claims priority to priority to U.S. Provisional Patent Application Ser. No. 61/452,086, filed Mar. 12, 2011 entitled "A Multipurpose Device for Computer Pointer Control, Facial Expression Management and Drowsiness Detection;" U.S. Provisional Patent Application Ser. No. 61/552,124 filed on Oct. 27, 2011 entitled "Multi-purpose Device for Computer Pointer Control, Facial Expressions Management and Drowsiness Detection;" and U.S. Provisional Patent Application Ser. No. 61/603,947 filed on Feb. 28, 2012 entitled "Multipurpose Controller for Computer Pointer Control, Facial Expression Management and Drowsiness Detection" the disclosures of which are all expressly incorporated herein by reference.

This application also claims priority to U.S. Provisional Patent Application Ser. No. 61/713,760, filed Oct. 15, 2012 entitled "Multipurpose Controllers Using Sliding Motion, Image, Body Orifice Sensors and User Intent;" and U.S. Provisional Patent Application Ser. No. 61/753,204 filed on Jan. 16, 2013 entitled "Controllers Using Sliding Motion, Image, Body Orifice Sensors and User Intent" the disclosures of which are also expressly incorporated herein by reference.

BACKGROUND

The present application relates to controlling electronic devices without the use of handheld and/or touch activated controllers. Efforts have been made for many years to eliminate the need to hold and/or touch controllers to control electronic devices. However, this has met with limited success due to a combination of multiple factors such as limitations on functionality provided (such as lack of hands-free or legs-free selection/clicking), complexity and cumbersomeness of use of the device, lack of accuracy and precision, lack of speed, lack of portability, lack of flexibility, and high cost of manufacturing. As a result, there are few competitively priced hands-free computer and other electronic device controller products available for use by the general public that have had wide commercial success.

SUMMARY

An apparatus is disclosed for a user to use to communicate with an electronic device. The apparatus includes memory, and a processor. The processor receives user intention actions comprising facial expression (FE) information indicative of one or more facial expressions performed by the user, and receives body information indicative of motion or position of one or more body parts of the user. The body information is distinct from the FE information. The processor also compares the FE information to a first FE level, and determines whether the FE information crosses the first FE level. When the FE information crosses the first FE level, the processor starts generating first signals to communicate with the electronic device. The first signals are based on the body information. The apparatus can include a touch sensor. The apparatus can be included in the electronic device.

The processor can compare the FE information to a second FE level and determine whether the FE information crosses the second FE level, and when the FE information crosses the second FE level, the processor can end generation of the first signals. The apparatus can also include a FE sensor that provides at least a portion of the FE information. The FE sensor can be a proximity sensor, a touch sensor, a sliding motion sensor, a body orifice sensor, an image sensor, or some other type of sensor. The FE information can be information indicative of touch between the FE sensor and one or more facial muscles of the user.

The apparatus can include a motion sensor that provides at least a portion of the body information. The motion sensor can be an inertial sensor, an image sensor or another type of sensor. The apparatus can include an image processing system and/or an eye gaze tracking system that provides at least a portion of the FE information and/or the body information.

The first signals can modify attributes of an object of interest (OOI) on the electronic device. The first signals can be modified based on the FE information. The attributes of the OOI can include location of the OOI, volume of the OOI, an identifier of the OOI, or other attributes. The OOI can be invisible to human eyes.

The processor can generate second signals based on the FE information. The processor can receive process information of the electronic device indicative of attributes of one or more processes running on the electronic device. The processor can modify the first signals based on the process information of the electronic device. The processor can save a portion of Facial Expression Management (FEM) information in the memory or on the electronic device. The FEM information can include the FE information, the body information and/or information indicative of the first signals as well as second signals. The processor can retrieve at least a portion of the FEM information from the memory.

The FE information can be based on the position of one or more facial muscles of the user. The one or more facial muscles of the user can include at least one muscle of the user's cheek, or of the user's mouth, or of the user's eye brow, or of the user's eye lid. The one or more body parts of the user can include the user's head, or one or more of the user's eye balls.

When the processor is generating the first signals, the processor can suspend generation of a first portion of the first signals for a first time duration after the FE information crosses the first FE level. The processor can suspend or resume generation of a second portion of the first signals based on a rate of change of the FE information. The second portion of the first signals can be the same as or different from the first portion of the first signals.

A method is disclosed for a user to use to communicate with an electronic device having a processor and memory. The method includes receiving facial expression (FE) information indicative of one or more facial expressions performed by the user; comparing the FE information to a first FE level using the processor; determining whether the FE information crosses the first FE level; receiving body information indicative of motion or position of one or more body parts of the user; measuring the body information using the processor when the FE information crosses the first FE level; and starting generation of first signals to communicate with the electronic device when the FE information crosses the first FE level. The first signals are based on the body information. The body information is distinct from the FE information.

A computer readable medium is disclosed comprising one or more programs configured to be executed by one or more processors to enable a user to communicate with an electronic device. The one or more programs include instructions for receiving facial expression (FE) information indicative of one or more facial expressions performed by the user; instructions for comparing the FE information to a first FE level; instructions for receiving body information indicative of motion or position of one or more body parts of the user, the body information being distinct from the FE information; instructions for measuring the body information when the FE information crosses the first FE level; and instructions for generating first signals to communicate with the electronic device when the FE information crosses the first FE level, the first signals being based on the body information.

An apparatus is disclosed for a user to communicate with an electronic device, where the apparatus includes one or more processors, memory, and one or more programs stored in the memory and configured to be executed by the one or more processors. The one or more programs include instructions for receiving first body information indicative of motion or position of a first set of one or more body parts of the user, instructions for comparing the first body information to a first body level; instructions for receiving second body information indicative of motion or position of a second set of one or more body parts of the user, the second body information being distinct from the first body information; instructions for receiving the second body information when the first body information crosses the first body level; and instructions for generating first signals to communicate with the electronic device when the first body information crosses the first body level, the first signals being based on the second body information. The first and second body information result from actions by the user. The first set of one or more body parts of the user can be one or more parts of the first arm of the user. The second set of one or more body parts of the user can be one or more parts of the second arm of the user.

An apparatus is disclosed for a user to communicate with an electronic device, where the apparatus includes one or more processors, memory, and one or more programs stored in the memory and configured to be executed by the one or more processors. The one or more programs can include instructions for receiving first facial expression (FE) information indicative of a first set of one or more facial expressions of the user; instructions for comparing the first FE information to a first FE level; instructions for receiving second FE information indicative of a second set of one or more facial expressions of the user; instructions for receiving the second FE information when the first FE information crosses the first FE level; and instructions for generating first signals to communicate with the electronic device when the first FE information crosses the first FE level, the first signals being based on the first FE information. The first and second FE information result from actions by the user. The second FE information is distinct from the first FE information. The one or more programs can also include instructions for comparing the second FE information to a second FE level; and instructions for generating second signals when the second FE information crosses the second FE level. The second signals are based on the second FE information, and the second signals are distinct from the first signals. The first set of one or more facial expressions can include facial expression involving the mouth of the user. The second set of one or more facial expressions can include facial expression involving the eye brows of the user.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The term "electronic device" is used to designate any devices that have a microprocessor and that can be communicated with. A microprocessor can include one or more processors, memory and programmable input/output peripherals. A controller can include one or more microprocessors and/or memory with instructions that can help control or communicate with electronic devices.

The term "Image Sensor" is used to refer to (but not limited to) any of the following types of sensors and their combinations—still or video camera, CMOS sensor, CCD sensor, RGB Sensor, depth sensor, range camera, 2D/3D camera, infrared sensor/camera, electromagnetic radiation sensor, active camera (that can change direction it points to, zoom in/out, pan/tilt/rotate, etc.), ultrasound sensors, soundfield sensors, and the like. The term image sensor is therefore meant to include sensors such as Kinect sensor available from Microsoft Corporation, Creative Interactive Gesture Camera from Intel Corporation and other similar sensors. Also, note that the term "Image Processing" is meant to include "Computer Vision". Therefore, reference to "image processing algorithms" also includes "computer vision algorithms"; reference to "image processing system" also includes "computer vision systems" and so on.

Throughout the specification and claims, different actions may be taken based upon the current relationship of a parameter and a threshold or level. Some examples include whether a parameter "crosses a threshold," "reaches a threshold," "leaves a threshold," "exceeds a threshold," "falls below a threshold," "crosses a level," "reaches a level," "leaves a level," "falls below a level," etc. In the specification and claims, the phrase "crosses a threshold" or "crosses a level" will be used as a general term intended to cover all of these scenarios.

Throughout this application, the term facial muscle is used to include facial skin as well as facial tissues. Further, the terms skin and muscles are also used interchangeably. The term "position" is used to include both a linear position (also known as location, which can be measured by X, Y, Z coordinates in 3D space) as well as angular position (also known as angular orientation, which can be measured by axis angles, Euler angles and the like).

Throughout this application and referenced applications, the term Primary Control Expression (PCE) is used to refer to user actions that can be used to signify user intention. This application also introduces the concept of Primary Control Motion (PCM) which is analogous to PCE and therefore can be used to signify user intention.

Figure 1:
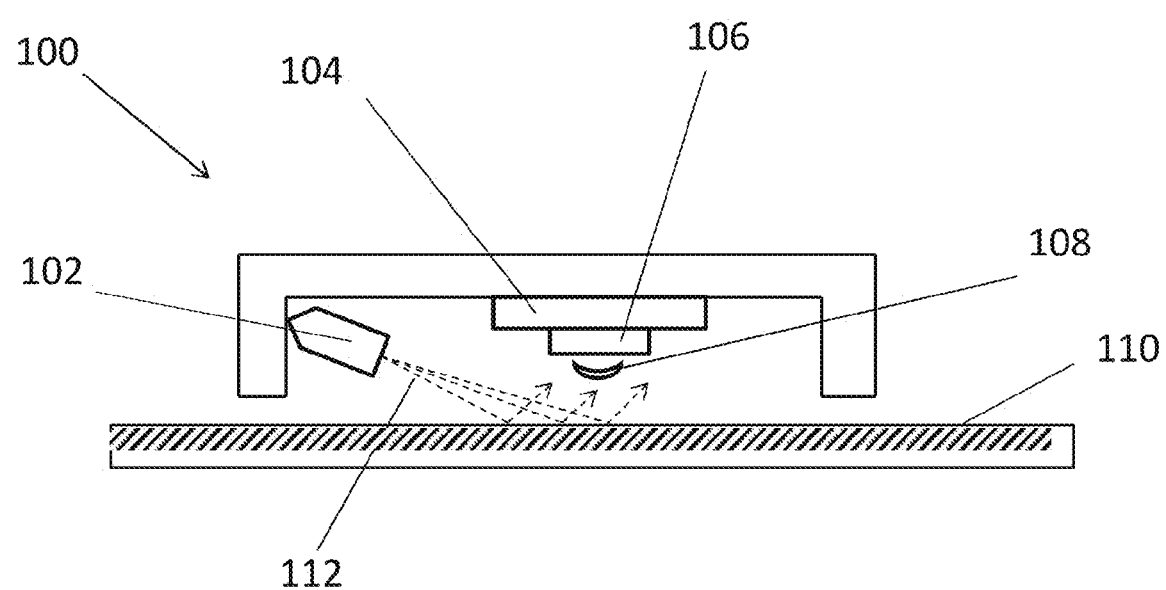
FIG. 1 shows a schematic representation of various parts of an exemplary embodiment of an optoelectronic sensor.

The above referenced non-provisional patent application discloses amongst other things, methods and apparatuses for sensing facial expressions. Sliding motion sensors such as Optoelectronic sensors, Roller ball sensors and the like can also be used for the purpose of monitoring motion and/or position of facial muscles and thereby detecting facial expressions. Optoelectronic sensors can include the following main elements—A light source to illuminate the surface whose motion is to be detected; a lens to focus light reflected from the illuminated surface onto an image sensor; an image sensor that takes images of the illuminated surface several times a second, and a Digital Signal Processor (a microprocessor or integrated circuits) that digitally compare(s) consecutive images taken by the image sensor to determine if the surface is moving relative to the image sensor, and if so, by what amount and in what direction. See FIG. 1 for a schematic representation of various parts of an optoelectronic sensor. It shows a Light Source 102, shining Light Rays 112 to illuminate Surface 110 whose relative motion is to be tracked with respect to the Optoelectronic Sensor 100. The light reflected from Surface 110 is focused by Lens 108 on to Image Sensor 106. This image sensor takes several images every second, which are then compared by Digital Signal Processor 104 to determine the motion (magnitude and direction) of the Optoelectronic Sensor 100 in relation to the surface whose sliding motion is being monitored. An Optoelectronic sensor can be placed within a focus range or distance from the surface being tracked so that the lens can form a well-focused image of the surface on the image sensor to provide greater sensitivity to movement. The Optoelectronic sensor may be less sensitive when it falls out of this focus range of distance.

Figure 2:
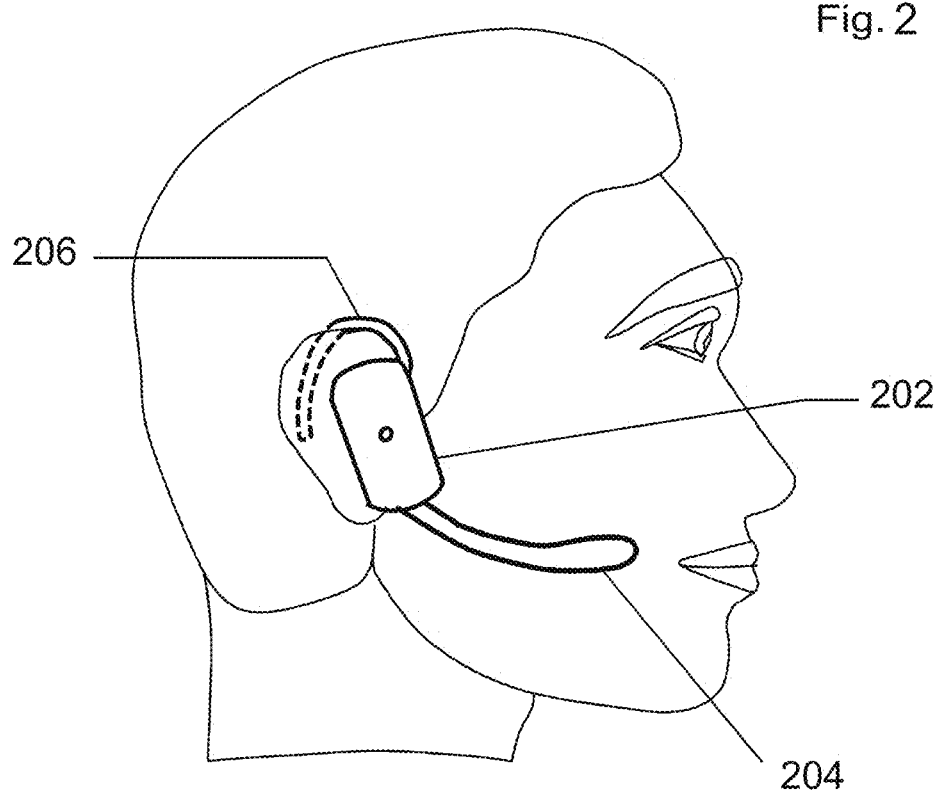
FIG. 2 shows a user wearing an exemplary embodiment of a controller.
Figure 3:
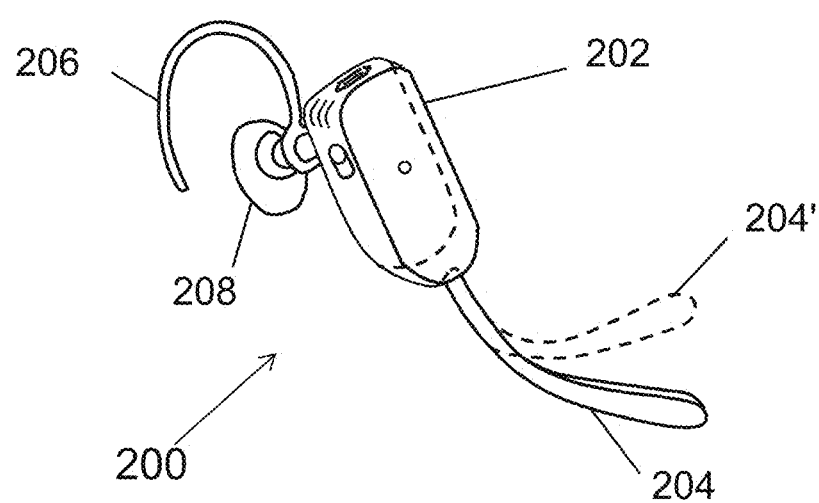
FIG. 3 shows perspective view of the controller of FIG. 2.

Optoelectronic sensors can also be used in controllers that work by detecting facial expressions and other bodily motions. Such controllers are described in the above mentioned non-provisional patent application. An embodiment of the controller shown in FIGS. 2 and 3 has a Housing 202, an Ear Clip 206, an Ear Bud 208 and an optoelectronic sensor mounted on the inner side of a Sensor Arm 204. The Sensor Arm 204 is positioned over part of the user's face or body that may experience surface motion during a particular facial expression or bodily action. The Sensor Arm 204 can be adjustable. FIG. 3 illustrates an alternate configuration of the sensor arm as Sensor Arm 204' showing an example of adjustment of the sensor arm 204. As an example, to detect the facial expression of a smile, the sensor arm may be adjusted so that the tip containing the light emitter and the image sensor of the optoelectronic controller is over an area of the face (of the user) that moves during the expression of a smile. One such area is demonstrated in FIG. 2 where the optoelectronic sensor is located in an area near the corner of the mouth. The user can adjust the arm to any other area so that the skin that moves during the expression brushes continuously against or stays within optimal distance range from the sensor arm/optoelectronic sensor. As the user displays the expression on his/her face, facial muscles move. This motion can be detected by the optoelectronic sensor. Optoelectronic sensors are especially good at detecting motion of the surface that does not result in change in distance between the surface and the sensor. This property of the optoelectronic sensor can be complementary to the property of other facial expressions sensors such as touch or proximity sensors that can be used to monitor changing distance between the surface being tracked and the sensor itself. The controller can be designed or configured to include an optoelectronic sensor as a facial expression sensor that is always in contact with the user's face/body to detect motion of the muscles even when they constantly touch the sensor. Optoelectronic sensors can be used by themselves as facial expression or body motion sensors, or they can be used in combination with proximity, touch or other sensors.

Figure 4:
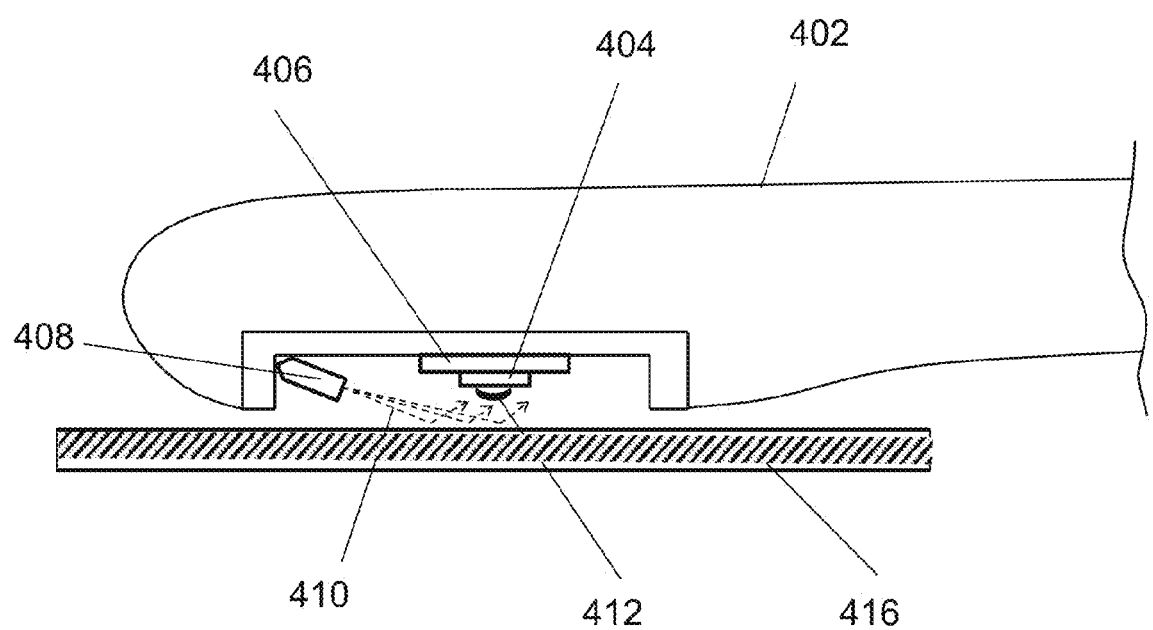
FIG. 4 shows a close up view of a Sensor Arm in an exemplary embodiment of a controller.

FIG. 4 shows a close up view of a Sensor Arm embodiment 402 where an optoelectronic sensor is built into the tip of the Sensor Arm 402. A Light Source 408, an Image Sensor 404, a Lens 412, and a Digital Signal Processor 406 are built into the tip of the Sensor Arm 402. Light Rays 410 are shown bouncing off of Surface 416. Note that in this case the surface being tracked is skin of the user's face, however, the sensor arm and the sensor could be tracking any surface of the body that experiences motion of the skin in correlation with an action on the part of the user.

Figure 5:
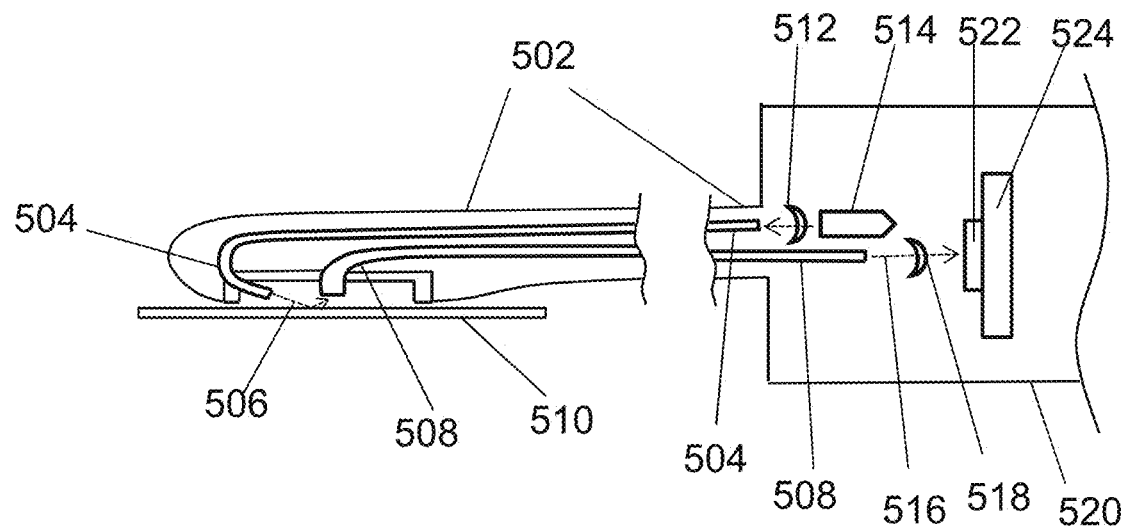
FIG. 5 shows a close up and sectional view of a Sensor Arm in an exemplary embodiment of a controller.

In some embodiments, the DSP/microprocessor of an optoelectronic sensor that does the image processing/computer vision algorithms to detect motion, can be separated out from the package containing the image sensor and be housed inside the housing of the controller, or can be completely eliminated so that the microprocessor or integrated circuits of the controller itself are utilized for the image processing. Further, the image sensor and light source could also be moved away from the surface being tracked and be situated in the housing of the controller in order to reduce space for housing the sensor in part of the controller that is close to the surface being tracked. FIG. 5 shows an embodiment where the tip of a Sensor Arm 502 contains Fiber Optic Cable(s) 504 to bring in the light from illuminating Light Source 514 (which is located inside the Housing 520 of the Controller). Light Rays 506 emanate out from the far end of the Cable(s) 504 and are reflected into Fiber Optic Cable(s) 508 which carry the reflection back to the Image Sensor 522 located in Housing 520. While Lenses 512 and 518 are shown in the Housing 520, other embodiments could have them situated in the tip of the Sensor Arm 502 or have an additional pair of lenses present in the tip of the sensor arm 502 (at the far end of cables 504 and 508, away from the housing 520).

Figure 6:
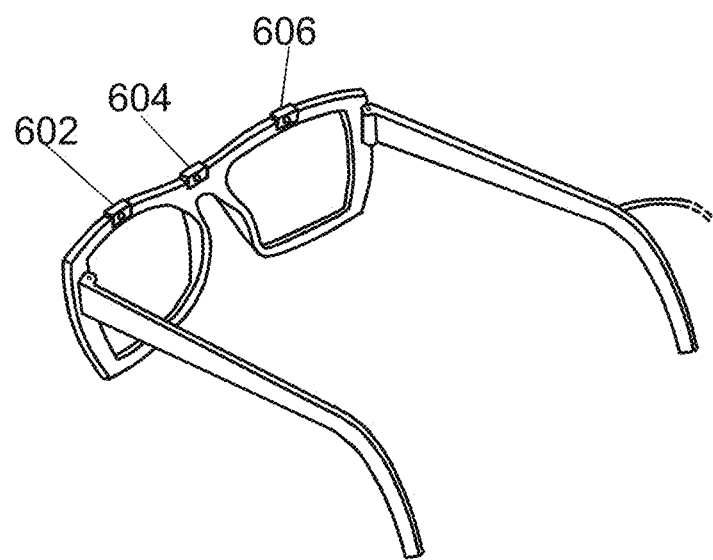
FIG. 6 shows an exemplary embodiment of a controller in the shape of eyeglasses.

In some embodiments, the optoelectronic sensor(s) can be mounted on other structures such as eyeglasses to monitor the motion of facial muscles in the vicinity. One such example is to mount the optoelectronic sensor(s) on the top rim of eyeglasses so as to monitor the motion of eyebrows and surrounding areas. FIG. 6 shows an embodiment of a controller in the shape of eyeglasses (as described in above mentioned non-provisional U.S. patent application) wherein Optoelectronic Sensors 602, 604 and 606 are used to detect motion of facial muscles/skin that move when eye brows are raised. The optoelectronic sensors could also be mounted on different parts of eyeglasses so as to monitor the motion of eyelids and surrounding areas as well as cheeks or any other areas around the eyeglasses. This can be used in drowsiness detection based on detecting opening and closing of the eyelids. Note that when the optoelectronic sensors are mounted such that they cannot be in direct contact with the surface being tracked, it can be necessary to employ lenses with appropriate focal lengths and/or place the lenses so that the image of the surface will be in focus during normal operation.

Following are some commercially available optoelectronic sensor components that could be used for facial expression detection—"PAN3101 CMOS Optical Mouse Sensor" (from PixArt Imaging Inc.); ADNS-2610 Optical Sensor with DSP (Digital Signal Processor) used along with a HDNS-2100 lens, HDNS-2200 clip to hold LED light sources and HLMP-ED80-XX000 LED light source (from Avago Technologies).

The digital signal processors of the optoelectronic sensors can output the magnitude and direction of sliding motion detected. This motion information can be used to detect if a point on the surface of part of human body (human skin) has moved from its starting position, and if so, how long it has been away from the starting position and how much, and if has returned back to the starting position. Since motion of skin can be associated with some action on the part of the user such as a facial expression, detection of displacement of the skin (from a previous position) can be used to detect facial expressions and/or other bodily motions. The presence, absence, amount and rate of change of detected displacement then can allow measuring presence, absence, level and rate of change in level of facial expression as well as other bodily motion. These measurements then can be used as FE readings or body motion/position readings, which can then be used in heuristics described in the above mentioned non-provisional U.S. patent application.

In one embodiment, the detected motion readings from the optoelectronic sensor are continuously accumulated (summated) to provide an indication of change in position (cumulative displacement) of the muscles from the time when the controller is powered on or initialized/calibrated. This computation of cumulative displacement is started right after the initialization/calibration period is completed. (The initialization/calibration process is explained in the above mentioned non-provisional U.S. patent application.) The value/magnitude of cumulative displacement from an initial position can be treated analogous to the proximity/touch sensor readings received from the proximity and/or touch sensors described in above mentioned non-provisional U.S. patent application. By treating value of "cumulative displacement" as a Primary Control Expression (PCE) Sensor Reading, the concepts and heuristics described in that application for use with other sensors are also available, applicable and usable with optoelectronic sensors. For example, the "Expression Baseline" sensor reading becomes the cumulative position change (displacement) reading obtained at the power on or at initialization/calibration time. Since the user can be expected to hold the body and face still, raw motion readings from the optoelectronic sensor can be close to zero and so can be the cumulative displacement reading. If the initialization lasts for a finite amount of time, the average, median, value at start, middle or end of initialization period, or some other equivalent value representing the initial position can be used as the Expression Baseline Reading. As an alternative, given that cumulative displacement readings will be measured from the initial position, Expression Baseline could simply be assigned a value of zero. The moment the initialization/calibration period is over, the displacement readings obtained from the optoelectronic sensor are continuously accumulated to obtain the cumulative displacement value at any given point in time. This running total (cumulative displacement) at any particular moment is then analogous to the PCE sensor reading, and can be used in the heuristics described in the above referenced non-provisional patent application.

Figure 7:
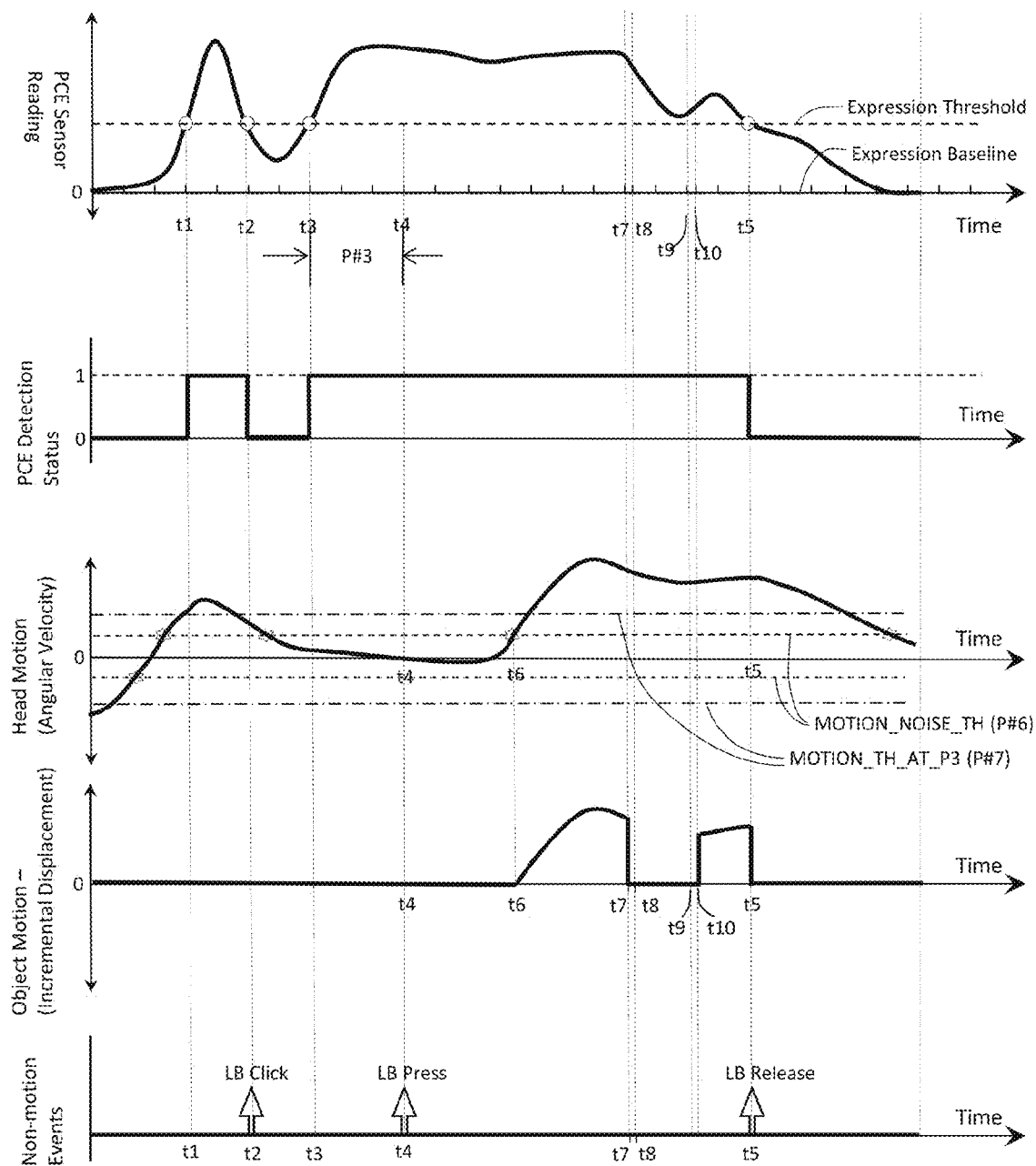
FIG. 7 shows exemplary heuristics for detection of primary controlling expression rising again based motion re-enablement.

The concept of "Expression Threshold" reading (as explained in the above mentioned non-provisional US patent application) is also applicable for optoelectronic sensors. As explained in the application this value could be software assigned or be designated by the user (directly or indirectly based on sensitivity settings of the controller). Expression Threshold in this case is the designated cumulative displacement from the initial position (Expression Baseline reading) beyond which an expression is deemed to have started. When the facial muscles/skin/body surface moves so that the current value of cumulative displacement crosses a designated Expression Threshold value, the expression is deemed to have started at that point in time. As long as the cumulative displacement is at or beyond the threshold value, the expression can be considered to be in progress. When the cumulative displacement falls back to be within the threshold, the expression is deemed to have terminated. See FIG. 7 for an equivalent of FIG. 22 from the above mentioned non-provisional patent application. The two figures are identical with the exception that Expression Baseline is shown to coincide with the X-axis on the topmost graph (PCE Sensor reading graph). The heuristics mentioned in the above mentioned non-provisional patent application such as PCE detection, starting and stopping of cursor motion, selection commands (mouse clicks), PCE Falling Too Fast, etc., can work similar to how they are described in the non-provisional patent application.

This principle of measuring sliding motion can also be utilized while using other kinds of sensors (that is other than optoelectronic sensors). For example, instead of optoelectronic sensors, mechanical sensors can be utilized to measure the sliding motion. This could be achieved by having a roller or set of rollers in the shape of circular wheels, spheres or any other shape touching the surface being tracked and being spun upon the motion of the skin. Friction with the surface/skin spins the rollers when they are contact with the surface while it is moving. This spinning motion then can be used to determine the instantaneous motion (magnitude and direction) of the surface, which then in turn is used to compute the cumulative displacement of the skin. This cumulative displacement and the rate of change of the cumulative displacement is then used similarly as the cumulative displacement computed from motion readings obtained from an optoelectronic sensor, in the heuristics described in the above mentioned non-provisional U.S. patent application. Further, the roller(s) in these mechanical sensors can be spring loaded so that they can also detect the force by which the surface is pushing on it. This force can vary if the skin in the particular body part being tracked is experiencing not just a sliding motion but motion perpendicular to the surface. This variation in force or resulting displacement of the roller perpendicular to the skin/surface can also be utilized in a fashion similar to the proximity readings obtained by proximity/touch sensors or similar to cumulative displacement readings from Optoelectronic sensors, in the heuristics.

Figure 9:
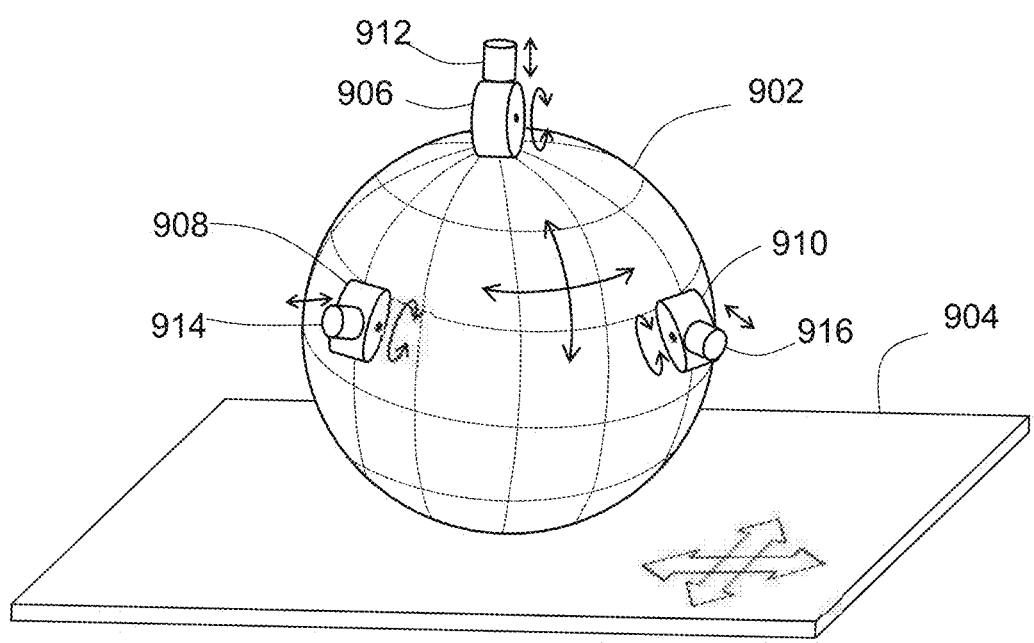
FIG. 9 shows schematic representation of an exemplary embodiment of a sensor using rollers for detection of sliding motion.

A schematic representation of one embodiment of a sensor using rollers for detection of sliding motion is shown in FIG. 9. A Roller 902 in the shape of a sphere is shown resting on Surface 904 whose sliding motion is to be tracked. The Roller 902 can be housed inside a sensor arm of a controller or any other structure that can hold the roller ball in contact with the sliding surface, possibly employing spring action to maintain good contact between the roller ball and the sliding surface. As the tracked surface 904 slides, the Roller 902 moves correspondingly due to friction between the roller 902 and the surface 904. The rolling motion of the roller 902 in turn spins smaller Rollers 906, 908 and 910. The rotational motion of the smaller rollers 906, 908, 910 can be measured to indirectly determine the motion of the Roller 902 and thereby the motion of the Surface 904. Alternatively, other means could be employed to measure the rotation of the Roller 902 as well. (Note that in the embodiment shown in FIG. 9, measuring motion of only two of the smaller rollers that are orthogonal to each other is sufficient. For example, it is sufficient to measure motions of the Roller 906 and 910, or the Rollers 908 and 910 to get a complete measurement of motion of the Roller 902.) FIG. 9 also shows force/pressure sensors 912, 914, 916 connected to the Rollers 906, 908 and 910 respectively. The force/pressure sensors 912, 914, 916 sense the force experienced by their respective rollers in the three orthogonal directions. These individual forces then can be summed up to compute the total force exerted by the Surface 904 on the Roller 902, and in turn the Sensor Arm or the structure that holds the Roller 902. When the Surface 904 moves in a purely sliding fashion there is only a nominal force exerted by it on the sensor/sensor arm/structure holding the sensor. However, if the sensor is placed on part of the body that results in sliding as well as motion that pushes into the sensor, then the Force/pressure sensors 912, 914, 916 are useful to compute resultant exerted force that can be used as an indicator of non-sliding motion of the tracked surface 904. This measure of non-sliding motion then can be used either in isolation or in conjunction with the measurement of sliding motion. The concepts of Expression Baseline, Expression Threshold, and other concepts/heuristics described in the above mentioned non-provisional patent application then can be applied to the sliding and/or non-sliding motion measurements.

In further variation of the sensor depicted in FIG. 9, the Force/Pressure sensors 912, 914, 916 could also have spring mechanisms built into them to keep the Roller 902 in touch with the surface 904. Further, the sensor arm and/or the structure holding the sensor could also have spring action and/or pressure sensors built into it, which could be used to measure the non-sliding motion, which then can be used in the heuristics. In yet another variation, rollers could be completely eliminated and the sensor could be adapted to only measure the force exerted by the skin surface on the sensor, and that measured force can be used as the PCE sensor reading in the heuristics.

Figure 8:
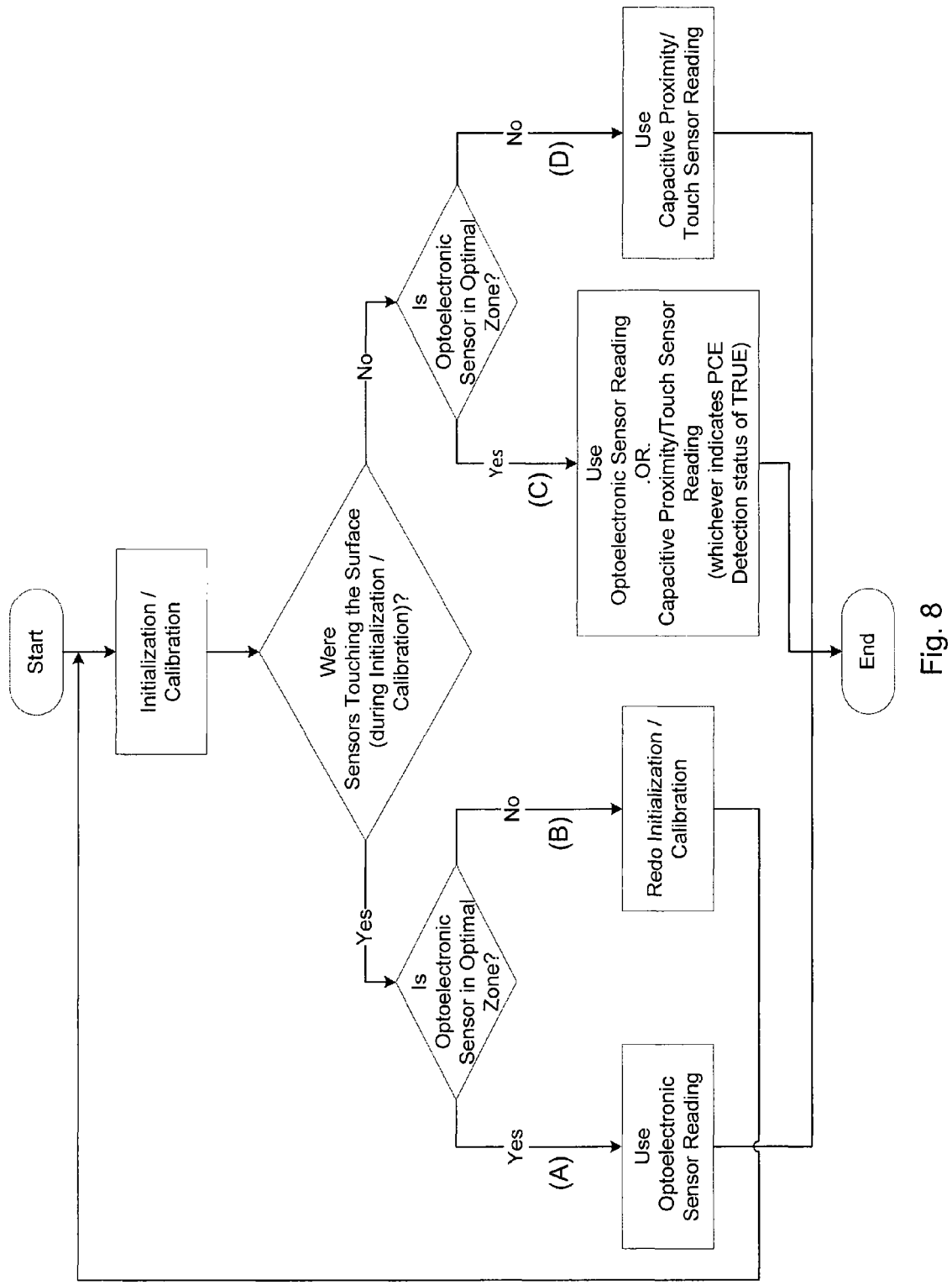
FIG. 8 shows an exemplary flow chart for PCE selection process.

Multiple variations of embodiments are possible by using the sensors described above in combination with themselves as well as with any of the sensors described in the above mentioned non-provisional patent application and at different locations on the user's body and/or the controller itself. It is also possible to turn certain sensors on/off per user command or automatically. For example, in one embodiment, if a sensor arm has an optoelectronic sensor as well as a capacitive proximity/touch sensor, and if the user wears the controller so that the sensors are touching the skin during initialization/calibration then the reading from the capacitive proximity/touch sensor can be ignored and the readings from the optoelectronic sensor can be used as the PCE Sensor reading. However, if later due to user intentional/unintentional adjustments of the sensor arm, the Optoelectronic sensor is no longer in the optimal range of distance (from the tracked surface) either the user could be prompted to do another initialization/recalibration, or the control software could automatically trigger an initialization/recalibration so that the capacitive proximity/touch sensor now can be used. If on the other hand, the sensors are not touching the surface during the initialization/calibration, then during the normal operation if the Optoelectronic sensor also happens to be in its optimal range of distance from the surface, then either of the sensors' detection of the PCE (Primary Control Expression) can be considered to be a valid detection of the PCE. However, if the Optoelectronic sensor ceases to be in its optimal range of distance from the tracked surface, then only the capacitive proximity/touch sensor's detection of PCE can be considered to be valid. FIG. 8 illustrates an exemplary decision making process for deciding which sensor's reading to use as the PCE sensor when an Optoelectronic sensor and a Capacitive Proximity/Touch Sensor are both present. As the flowchart explains, when in situation (A) where the sensors were touching the surface during calibration and the optoelectronic sensor is in the focus zone, use the readings (cumulative displacement) from the Optoelectronic sensor as the PCE Sensor readings. In situation (B) where the sensors were touching the surface during calibration and the optoelectronic sensor is not in the focus zone, neither of the sensors readings are in a reliable state, so reset the PCE Detection status to "False", terminate the expression and then either instruct the user to readjust the sensor arm and/or reinitialize/recalibrate, or invoke the initialization/recalibration procedure automatically for the user. In situation (C) where the sensors were not touching the surface during calibration and the optoelectronic sensor is in the focus zone, either of the sensor readings could be used, but the moment one sensor reading indicates PCE Detection status of "True", from that point onwards only use that particular sensor's readings (and ignore the other sensor's reading) till the point in time that the first (former) sensor reverts back to PCE Detection status of "False". At this point, both the sensors' readings are again monitored for detecting occurrence/inception of the next PCE. In situation (D) where the sensors were not touching the surface during calibration and the optoelectronic sensor is not in the focus zone, use the Capacitive proximity/touch sensor's reading as the PCE sensor reading. Using the process/principles demonstrated above, persons skilled in the art can easily devise decision processes for other combinations of sensors.

A user gesture can be defined as a combination of actions performed (by the user) with the intent of communicating with or controlling an Electronic Device. These actions can be bodily actions can include motions of various body parts, facial expressions, actions to orient and hold various bodily parts in certain poses/positions/orientations, as well as other bodily actions. Some embodiments can also use actions performed by the user such as speech/speaking, holding breath/inhaling/exhaling, tensing of muscles/body parts (that may or may not be visible externally), and so on as bodily actions. User actions such as entering meditative or attentive state, consciously relaxing the body with or without meditation, deep breathing, etc. can also be used as indicators of user intent. A user gesture can require some bodily actions to be performed in a specified sequence, while requiring other bodily actions to be performed concurrently/simultaneously with each other. User gestures can be recognized and translated by the controller or control system into signals to communicate with and/or control an Electronic Device. Some user gestures can be recognized and translated into signals to control the controller/control system itself. Signals generated in response to some user gestures may be stored in the control system or controlled device for indefinite amount of time and that stored signal information can be retrieved when required. Bodily actions performed as part of a user gesture can serve various purposes in a specified user gesture. Following are some types of bodily actions based on the purpose they fulfill in a user gesture.
  i. Actions Enabling/Disabling Generation of Signals (AEGS)
  ii. Actions Influencing Attributes of Signals being/to be Generated (AIAGS)
  iii. Actions that Confirm User Intent (ACUI)
  iv. Actions that are Demarcators (i.e. help demarcate one part of user gesture from another, or even help demarcate one user gesture from another)
  v. Actions with Multiple Purposes (AMP) (i.e. they can fulfill a combination of multiple purposes simultaneously)

Note: A particular bodily action can serve different purposes (and thereby can be viewed as having different types) when it is used in different types of user gestures. Further, a particular bodily action can occur multiple times within a user gesture and can be specified to have different purpose(s) (type/types) during different occurrences.

Note: Any particular heuristics (explained in this as well as the referenced applications) can be implemented in a controller/control system by means of multiple user gestures. For example, the selection heuristics can be implemented in one embodiment using a first user gesture that uses a Smile facial expression as the PCE as well as another user gesture that uses a Eyebrow Raise facial expression as the PCE, and so on.

The above mentioned non-provisional US patent applications disclose amongst other things, the use of Primary Control Expressions (PCEs) and Bodily Motions to achieve control of electronic devices. PCEs are designated facial expressions that can have special significance when communicating with electronic devices. PCEs can be used as AEGS in various user gestures. For example, PCEs are AEGS in OOI Motion and Click-and-Drag Heuristics. However, the role of PCE can be viewed as AMP in the Selection Heuristic as the PCE alone enables the generation of a signals as well as cause that generation. Various facial expressions include, but are not limited to, smile, frown (with eyebrow or mouth), eyebrow raises, jaw drops, teeth clenches, closing/opening mouth, puffing cheeks, pouting, nose wiggles, ear wiggles, opening/closing eyes, blinking, winking and other motions of the facial muscles. Note that in some cultures, "frown" means contracting the brow where eyebrows can come closer together and the forehead can appear wrinkled. Whereas in other cultures, "frown" can be an expression of mouth where corners of the mouth can be pulled or curled downwards. Therefore, for clarity, we will distinguish between the two kinds of frowns as "eyebrow frown" or "mouth frown" as and when needed; otherwise the term frown will be used to refer to either of them or both.

The concept of Primary Control Motion (PCM) is similar to the concept of PCE. While a PCE is facial expression, a PCM can be a designated bodily motion or pose/position/orientation (of a designated set of one or more body parts). PCM can include designated combination(s) or sequence(s) of bodily motions that can include motions of the entire head, eyeballs, hands, fingers, arms, shoulders, torso, legs, feet, toes, etc. Note that motions of the entire head such as head nods, head tilts, side to side heads motions or head rolls, etc. are considered to be head/body motions and not facial expressions. Motion of the eyeballs is also considered to be body motion and not a facial expression. However, motion of eyelids such as opening/closing of eyes, blinking and winking are considered to be facial expressions. Similarly, motion of eyebrows such as eyebrow raises, furrowing of eyebrows and other eyebrow motions are considered to be facial expressions. Just as PCEs, PCMs are accorded special significance when communicating with electronic devices. A PCM or a PCE can be used as an enabler, trigger, modifier, or even as a specific command, while communicating with an Electronic Device. PCE and PCM can also comprise actions such as entering meditative/attentive states, tensing internal muscles, relaxing, deep breathing, etc. as these actions can be used to signify user intention and thereby can be used in heuristics explained just as any other body actions. PCEs and PCMs together can be called as User Intention actions.

Note: A general rule of thumb for distinguishing PCM from PCE is to consider if the designated body action involves rigid body motion of body parts versus non-rigid body motion. If the body action involves rigid body motion (that is where the shape of individual parts does not change) then that can be considered to be PCM; e.g. motion of head/eye balls/fingers/forearm/arm, opening or closing of hand into a fist, and so on. If the body action involves non-rigid body motion, such as changing shape of the mouth (by smiling, frowning, pouting, opening/closing the mouth, etc.), changing shape of the cheek muscles, changing opening of the eye/squinting/winking/blinking, raising eye brows, furrowing of the eye brows, etc. can be considered to be facial expressions and therefore designated as PCE. Despite the differences in body actions, PCEs and PCMs can be completely equivalent to each other when it comes to performing designated functions in user gestures, and therefore be used interchangeably in various heuristics and user gestures.

Just as PCEs, the level of PCM can be an important aspect in the heuristics and user gestures. Multitude of measures can be used to measure level of a PCM, based on suitability for the embodiment of the controller, user preferences, settings as well as the aspects of the controlled device itself. As an example, in one embodiment, one PCM can be the bodily motion of raising the left hand. In this case, the PCM is considered to be initiated when the left hand is raised beyond a specified level (threshold) and terminated when the level of hand raised-ness falls below a second threshold. This level of hand raised-ness can be measured by measuring the relative vertical position of the hand/feature of the hand compared to the position of the elbow, possibly also taking into account of the size of the forearm or upper arm. In another embodiment, PCM can be raising the left hand and closing it in a fist. In this case, the PCM can be considered to not have initiated unless both conditions (raising the left hand and closing it in a first) are met. Further the level of this PCM can be defined as a combination of at least one of those constituent actions; for example, the level of this PCM could be defined to be totally based on the level of closed-ness of the left hand, or level of raising of the left hand or a combination of both. Yet another example of PCM can be raising left hand and rotating the left forearm from the elbow to tilt it at an angle towards left or right side. In this case, the angle of tilt can be used in determining the level of the PCM. These were just some illustrative examples of PCMs, and it is to be noted that PCMs can be made up of any number and types of bodily motions and can be used just as PCEs. PCEs as well as PCMs can act as AEGS, ACUI as well as AMPs in user gestures.

As explained in the above mentioned non-provisional US patent application, OOI can be a cursor, pointer, graphical icon, view/camera angle, direction of interest, selected text, selected area of a graphical display, scroll bar or any other virtual/graphical entity on the display of an electronic device, etc. An OOI can also be the currently selected physical button/slider/knob or any other input mechanism on the controlled electronic device. Typically, when an OOI is chosen to be influenced by means of a user gesture, there is an Attribute of Interest (AOI) that belongs to that OOI that is implicitly being considered. For example, if a designated OOI is a pointer on the display screen of a computer, when performing the user gesture for moving the pointer, it is the attribute "location" (the AOI) of the pointer (OOI) that is being modified as part of the OOI Motion heuristics or Click-and-Drag heuristics. If the designated OOI was the scroll bar belonging to a window on a computer screen, then the AOI can be the location of the "scroll box" (a.k.a. "thumb") on the scroll bar. Then "motion" of the scroll bar/box really refers to changing the location (the AOI) of the scroll box (the OOI). People skilled in the art will realize that "motion" of OOI is really a special case of "modification" of the chosen attribute (AOI) of the OOI. Therefore, any reference to "moving" the OOI or "motion" of OOI in any of the heuristics explained in this or referenced applications can be replaced by (and/or taken to include) "modifying" or "modification" of the OOI. Following are few examples of OOI and AOI.

| # | Object of Interest (OOI) | Attribute of Interest (AOI belonging to OOI) | Result of Modification of OOI (via user gestures) |
|---|---|---|---|
| 1. | Cursor/Pointer | Location | Cursor/Pointer moves on the Display Screen |
| 2. | Cursor/Pointer | Size | Size of Cursor/Pointer changes |
| 3. | Currently Selected Button/Input mechanism on an Home Entertainment System | Identifier of the Button/Input Mechanism (that is currently selected) | A different button gets selected (which can be observable as a change in highlighting of the button/input mechanism) |
| 4. | Wheel Chair | Location | Wheel chair moves |
| 5. | Sounds generated by a Stereo system | Volume | Sound Volume changes |
| 6. | Currently Selected Song on a Music Player | Song Identifier | Selection of Song changes |
| 7. | Current Location within a Song/Media file that is being played on a Media Player | Location within a Song/Media file | The current location from which the song/media file can start playing changes. |

Note that, as explained in the referenced application, OOI/AOI can change in middle of a user gesture. For example, when using the OOI Motion or Click-And-Drag Heuristics/user gestures to control a Home Entertainment System, based on the duration for which body motion is being held steady (i.e. within specified threshold) after the initiation of the PCE/PCM, the AOI can change from the id of the currently selected button to the level setting of the currently selected button.

Body actions such as motion of one or more body parts and/or placing/posing/orienting one or more body parts in certain positions (including motions & poses/positions of the entire head, eyeballs, arms, hands, fingers, legs, torso, and other body parts) or other body actions that have not been already designated as PCM/PCE can be designated to be used for purpose of modifying/influencing designated attributes of an OOI. These designated body actions will be called OOI Modification Drivers (OMD). An electronic device can then be controlled via use of combination of PCMs and/or PCEs and/or OMDs. A User Gesture then can be a specified combination of PCMs, PCEs and OMDs performed or held in succession and/or simultaneously with each other. Some embodiments can also use body actions such as speech/speaking, holding breath/inhaling/exhaling, tensing of muscles/body parts (that may or may not be observable), entering meditative or attentive state, etc., which can be designated as PCE/PCM or OMD. User gestures can be used to generate signals for communication with electronic devices, User gestures can also signify user intent and thereby used to decide if/when certain other user gestures can cause signals to be generated to communicate with the controlled device. Note that the term "positions" can include linear/translational positions as well as angular positions. Thereby the term positions can include angular orientations.

OMDs can also include motions & positions of objects that are not part of the body but that can be directly or indirectly moved by the user. For example, motion of a pencil can be used as an OMD, provided that the user is directly or indirectly causing the motion of the pencil and the controller/control system is able to sense the motion of the pencil. Though OMDs can be used as AIAGS (Actions influencing attributes of generated signals) such as for modifying signals for motion of OOI, some OMDs can be used as Demarcators, ACUIs as well as AMPs. For example, certain patterns of OMDs may be used as pre-requisites for recognition and processing of other user gestures.

The presence of a PCE/PCM, magnitude/level of the PCE/PCM as well as the time variance of magnitude/level of the PCE/PCM can be considered along with the magnitude/direction as well as the variance of magnitude/direction of OMD, in order to translate user actions into commands/control signals for the electronic device being controlled. The presence of a PCE/PCM can also be defined in terms of a threshold on the value of the magnitude/level of the PCE/PCM. Time variance of PCE/PCM or OMD can include rate of change of magnitude/level of PCE/PCM or OMD with respect to time at any given instant. Alternatively, time variance can also be measured as change over a specified time interval or between two designated events (such as start or end of two different iterations when running the Control Software). Time variance can also include change in the presence/bounded-ness of (the magnitude/level of) PCE/PCM or OMD over a specified time period. Time variance can also include presence of (the magnitude/level of) PCE/PCM or OMD above or below a specified threshold, as well as other indicators of measuring time variance. Further, time variance can be expressed as amount of change over a standard unit of time or as amount of change over designated number of (contiguous) iterations/measurements. Magnitude/levels as well as time variance of PCEs/PCMs/OMDs can be considered in relation to each other for the purpose of interpreting user actions and translating them into commands for the electronic device. The time concurrency of PCE/PCMs with the OMD can be an important consideration as well. Examples of this approach of interpretation and translation of user actions into commands/control signals /communications with the controlled electronic device are presented in the various heuristics mentioned in the above referenced application as well as this document.

Figure 21:
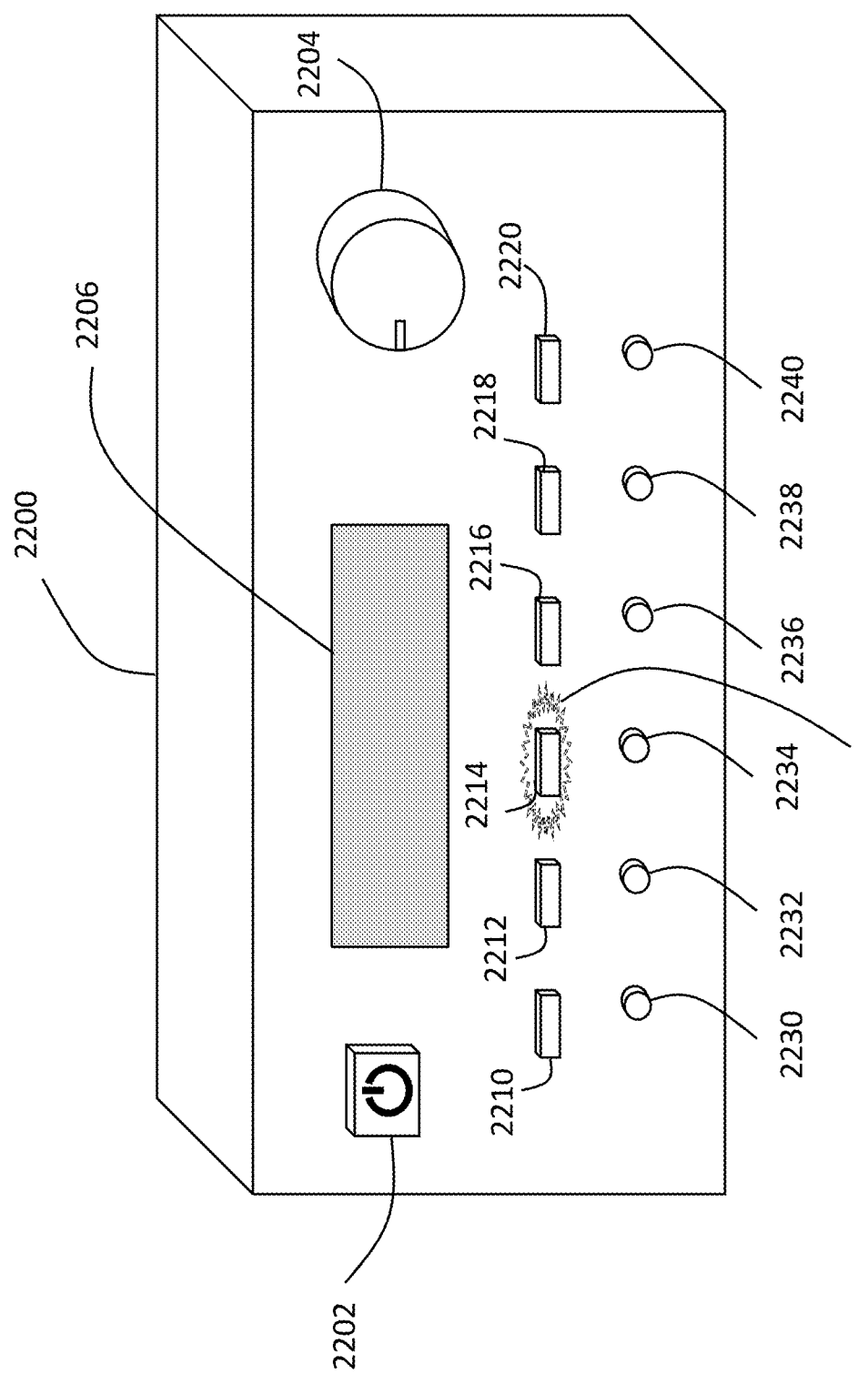
FIG. 21 shows an exemplary OOI on a controlled electronic device with multiple input mechanisms.

When an OOI is such that it cannot be physically or virtually moved by the user (for example a physical button/slider/etc. on an electronic device or an immovable graphical icon on a display screen of an electronic device), motion of OOI means change in designation of the currently selected button/graphical icon/input mechanism to a new one. In such cases, when the user attempts to "move" the OOI, the system merely selects a new input mechanism/button as the new OOI. (As explained earlier in this document, the AOI in this case is the id of the input mechanism/button that is currently selected.) This change in designation of currently selected input mechanism is done in accordance to the OMD. FIG. 21 shows an example of an electronic device that has input mechanism (buttons, dials, etc.) that cannot physically be moved or relocated. The electronic device 2200 is an audio/video amplifier from a home media system. It has a power button 2202, volume control dial 2204 and an electronic display 2206. The illustration of this device also shows a row of various command buttons 2210, 2212, 2214, 2216, 2218 and 2220. At the bottom, it shows another row of mode selection buttons 2230, 2232, 2234, 2236, 2238 and 2240. Buttons 2210 through 2240 are all push buttons. Other details of the audio/video amplifier are not shown for simplicity. The button 2214 is shown as highlighted by means of a glow 2215. Note that other mechanisms can also be used to indicate the currently selected input mechanism (that is to highlight the OOI); further, the name of the highlighted input mechanism can also be displayed on the display screen 2206. In this embodiment, if the user initiates the PCE (such as a smile) and moves their head towards the right (where head motion is the OMD), as per the heuristics of OOI motion explained before, the glow/highlight 2215 is moved from the button 2214 to the button 2216. This means that the button 2214 returns to its normal state of illumination and the button 2216 starts to glow instead. This indicates to the user that the button 2216 is now the OOI and that the OOI has moved from being the button 2214 to the button 2216. If the user so desires, they can maintain (continue to hold) the PCE and continue moving the head towards the right to cause the next button on the right (button 2218) to be selected as the new OOI. This process can continue until the button 2220, the rightmost button on that row of buttons, becomes the OOI. At that point, continued attempts to move the OOI to further right can either be ignored or can cause the leftmost button of some other row (either above or below the current row) to be selected, and the OOI can continue to move towards the right in accordance with the user's continuing to hold the PCE and moving the head to the right. Similar approaches can be used with other head motions (left, up or down). When the user uses the Selection heuristic (that is the user starts and terminates a PCE in the specified time interval), and if the current OOI is a button/dial/input mechanism that allows it be pushed, it can cause that input mechanism to be "clicked" (that is act as if it was pushed by the user). For example, "clicking" of the button 2230 may change input audio source of the amplifier to be radio and "clicking" of the button 2232 may change input audio source to DVD, and "clicking" of the volume control dial 2204 may cause the system to go in mute mode. Further, if the current OOI is the dial 2204, and the user performs the "Click and Drag" heuristic, then the head motion during the drag part of the process is used to turn up or down the volume. For example, trying to click and drag the dial 2204 upwards or rightwards can be made to cause the volume to go up, and trying to click and drag the dial 2204 downwards or leftwards can reduce the volume. In other embodiments, other actions can also be caused on the electronic device based on the nature of motion when performing Click and Drag. Choosing the power button 2202 as the OOI and performing "click" on it can cause the device to "power off" (or go in power save mode). Some embodiments can interpret double click on any input mechanism as a power off or power on of the entire device.

Figure 10:
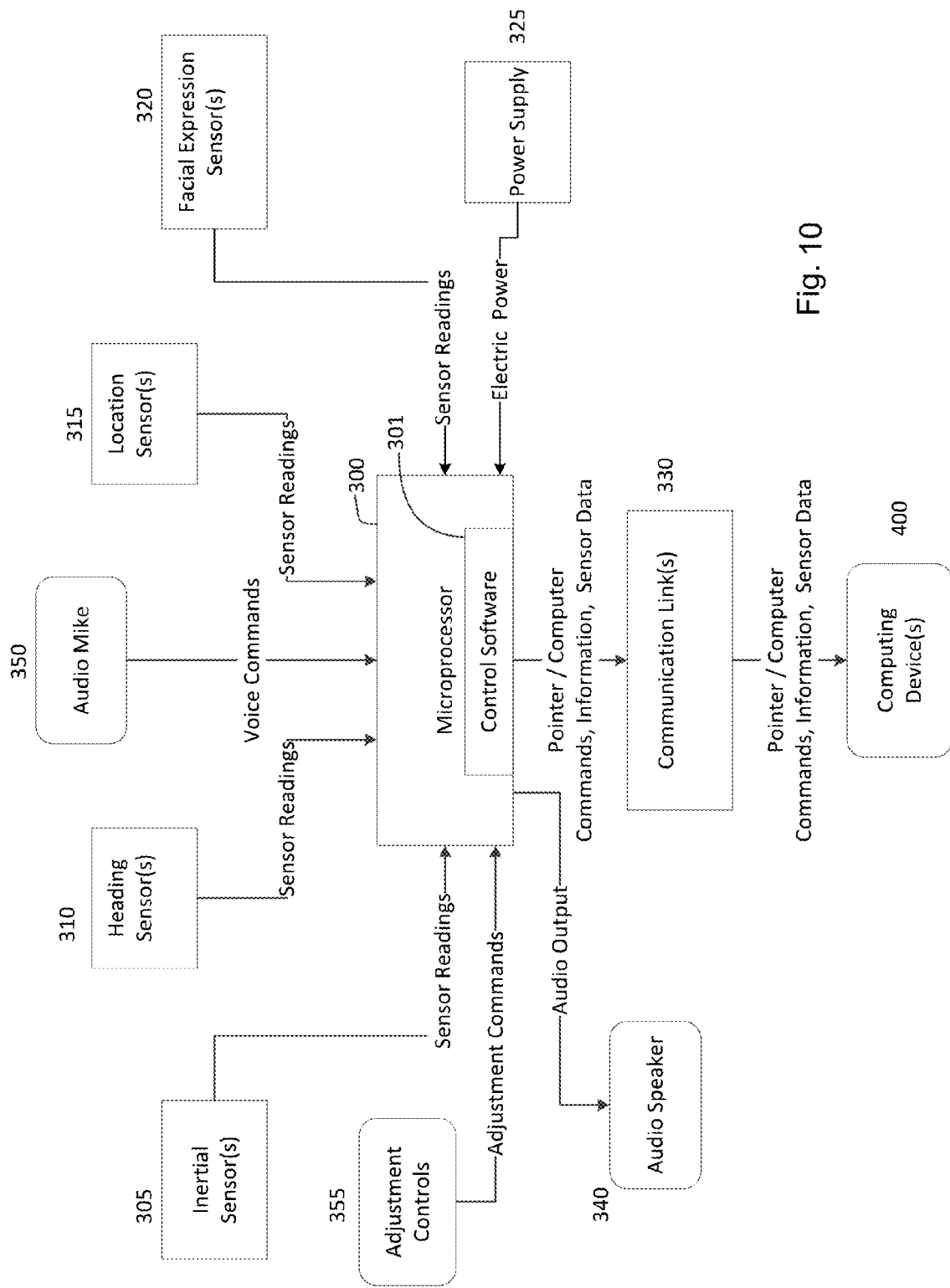
FIG. 10 shows a schematic view of the signal flow for several components of an exemplary controller.

FIG. 10 is a reproduction of a figure from the above referenced non-provisional patent application. It schematically depicts various components (boxes 300-355) of an embodiment of the multipurpose controller used to control an Electronic/Computing Device 400 and the information flow between them. Note that the term "electronic device" is used to designate any devices that have a microprocessor (or integrated circuits) and which can be controlled or whose operation(s) can be influenced, or simply can be communicated with. This includes, but is not limited to computers (desktop, laptop, tablet and others), mobile phones, heads-up display (HUD) and head mounted display (HMD) devices, augmented reality devices, video game systems, home-theater systems, industrial machinery, medical equipment, household appliances as well as light fixtures. Note that a microprocessor can include one or more processors, memory, and programmable input/output peripherals. A controller can include one or more microprocessors and/or memory with instructions that can help control or communicate with electronic devices.

Figure 11:
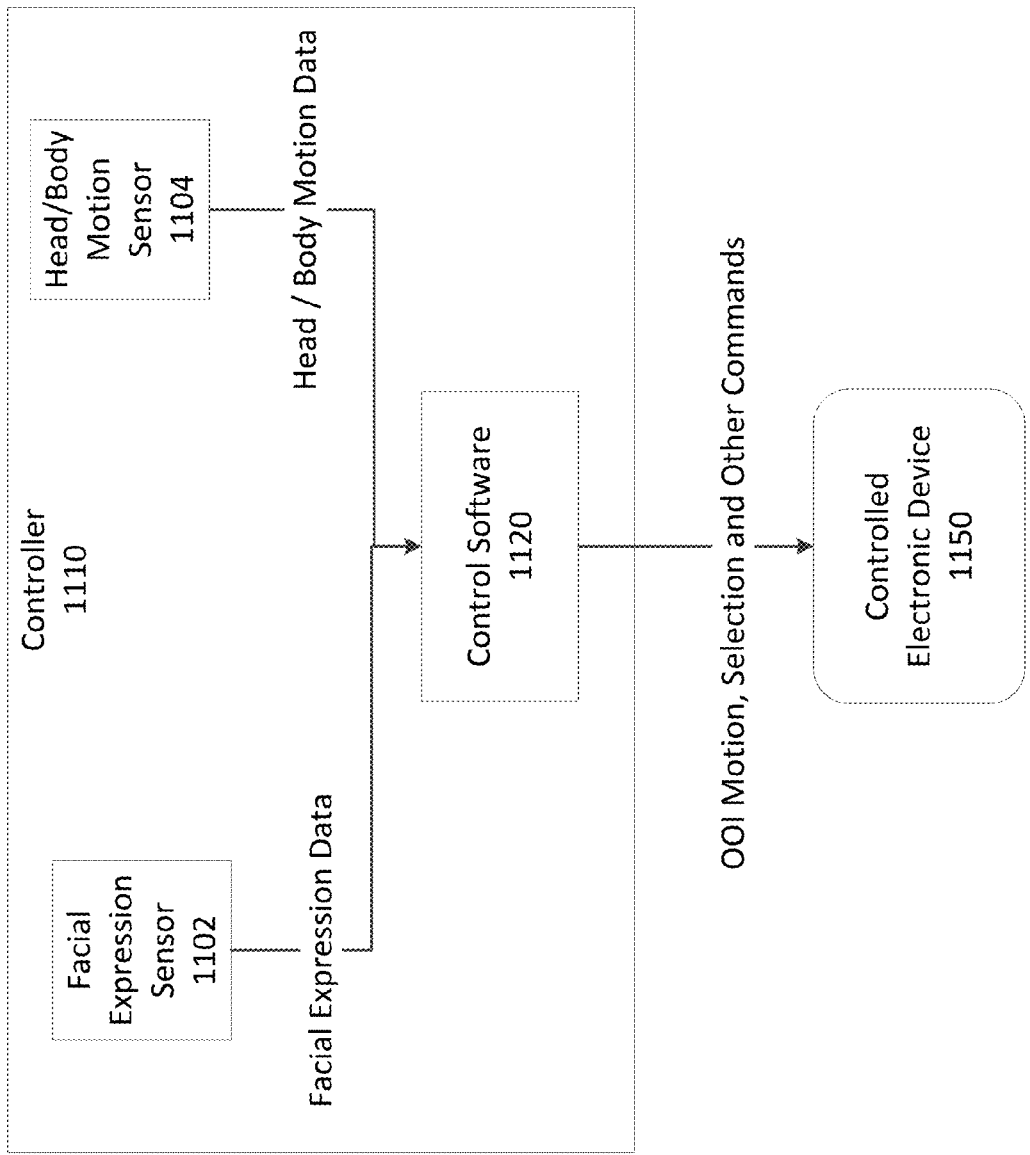
FIG. 11 shows an exemplary simplified representation of the embodiment shown in FIG. 10.
Figure 22:
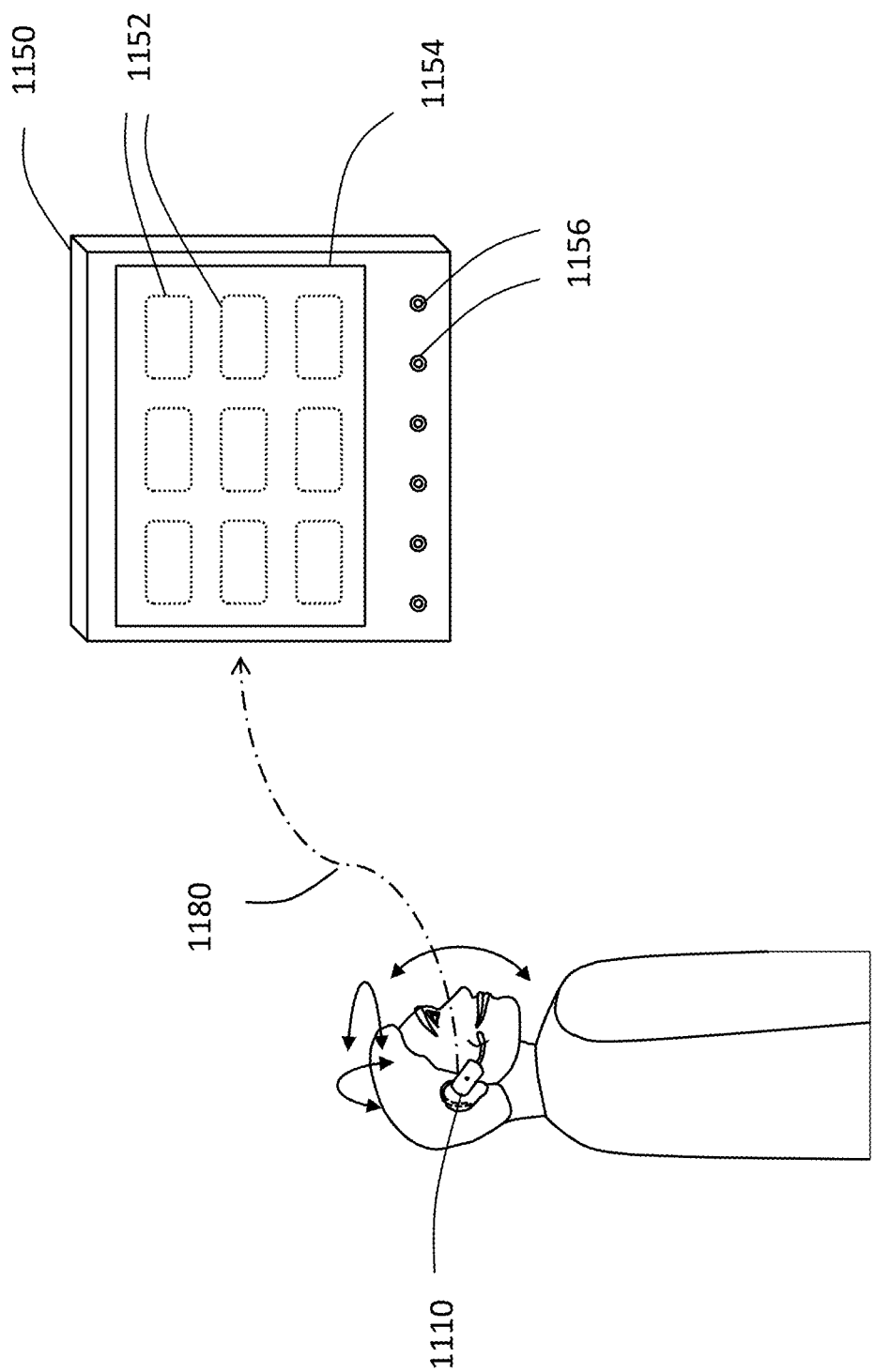
FIG. 22 shows an exemplary embodiment being used to control an electronic device.

FIG. 11 is a simplified representation of the embodiment shown in FIG. 10, listing only a few key components. Controller 1110 is shown to contain Facial Expression (FE) Sensors 1102 which generates FE information and Head/Body Motion Sensors 1104 that generate Head/Body Motion information. For the embodiment in FIG. 11, examples of FE sensors include proximity sensors (including but not limited to capacitive, resistive, electric field, inductive, hall effect, reed, eddy current, magneto resistive, photo-reflective, optical shadow, optical IR, optical color recognition, ultrasonic, acoustic emission, radar, sonar, conductive or resistive, etc.), touch sensors, flex sensors, strain gages/sensors, Electro-myography (EMG) sensors, etc. The FE information includes information indicative of various facial expressions such as (but not limited to) data indicating presence/absence and/or strength/level of the facial expression at any given moment of time. It may also include data related to rate and amount of change of level of FE from the previous time that information was gathered to the latest time of measurement. In this embodiment, the Head/Body Motion Sensor 1104 includes inertial sensors (such as gyroscopes, accelerometers, tilt-meters and the like). Control Software 1120 is also shown to be part of the Controller 1110; it runs on the microprocessor(s) or integrated circuits that are part of the Controller 1110. Control Software 1120 provides the logic/intelligence to process the sensor data, process information from various controls, communicate with the controlled electronic devices, communicate with output components, etc. (Note that the Control Software for this or any embodiment may be partially or fully implemented on hardware/integrated circuits for performance or any other reasons.) FIG. 22 illustrates an exemplary scenario where such an embodiment may be used. It shows the user wearing a controller 1110 and controlling a TV 1150 by means of user gestures (motions of head and facial expressions). The controller in this embodiment incorporates the FE Sensor(s) 1102, Head/Body Motion Sensor(s) 1104 as well as the Control Software 1120 and is in direct communication with the TV 1150 (the controlled electronic device) sending the TV 1150 various control commands 1180 to control it as well as provide it other information. The exemplary Controlled Electronic Device 1150 shows a display 1154, a row of physical input mechanisms (buttons) 1156 and a matrix of virtual buttons 1152 on the display 1154. The user could control the device 1150 via any of the physical row of buttons 1156 or use a special cue to select from the matrix of virtual buttons/graphical icons 1152. For example, in one embodiment, performing a double "click" could enable or disable selection of physical versus virtual input mechanism on the device 1150. That is, if the current OOI is one of the physical buttons 1156, the user could perform a double click and that would move the OOI from the physical row of buttons 1156 to one of the virtual buttons in the matrix 1152. Future OOI motions then would restrict the OOI to be one of the virtual buttons 1152 only, until the user does another double click to bring back the OOI to the physical buttons 1156. It will be obvious to persons knowledgeable in the art that other cues (other than double click) could be used to go between the physical and virtual realm. Further, other embodiments may not even have the need for a special cue by not discriminating between physical and virtual mechanisms allowing the OOI to move seamlessly between the physical and virtual input mechanisms.

Figure 12:
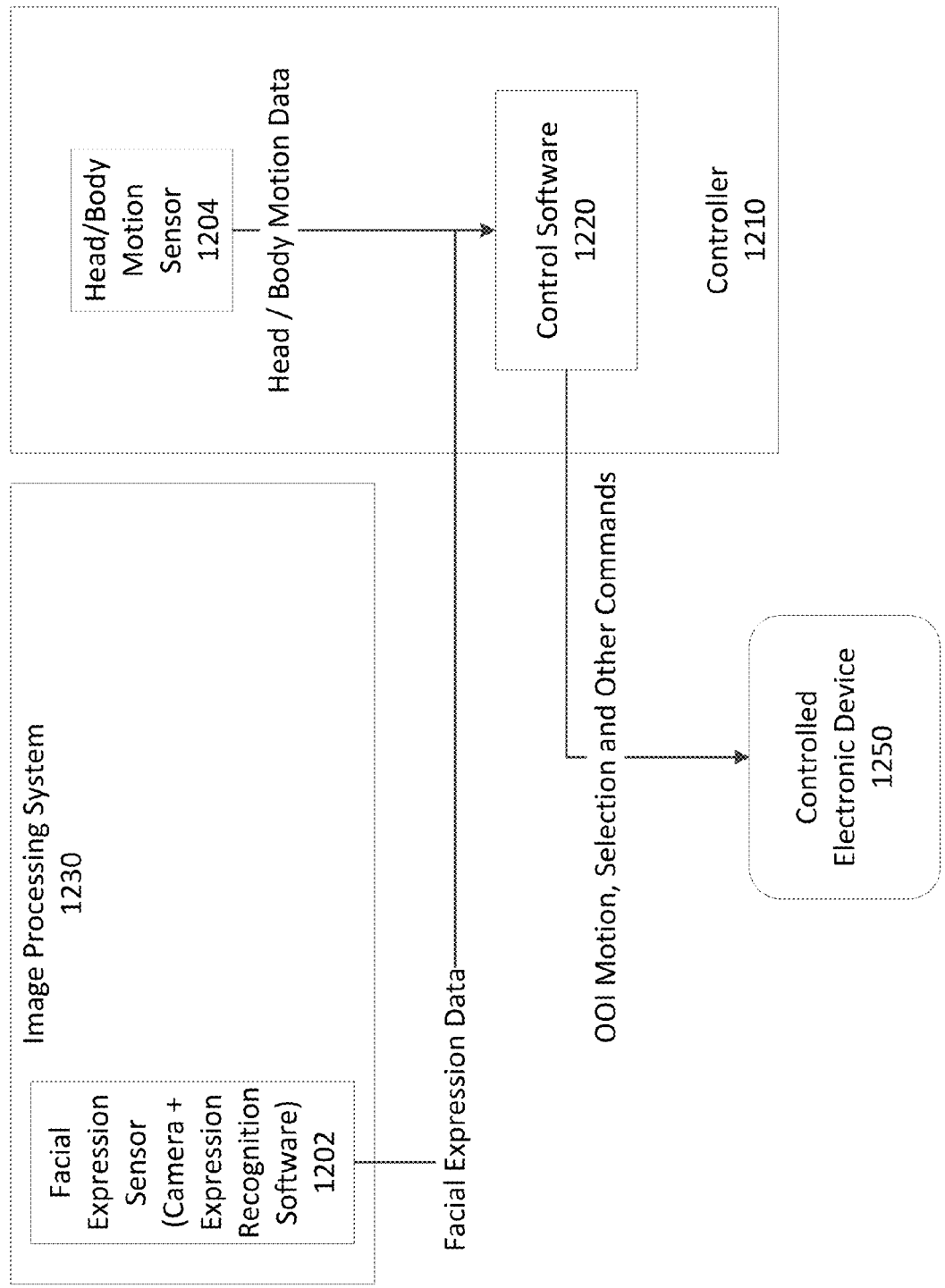
FIG. 12 shows a schematic representation of an exemplary embodiment of a controller where an Image Processing System performs as a FE sensor.
Figure 23:
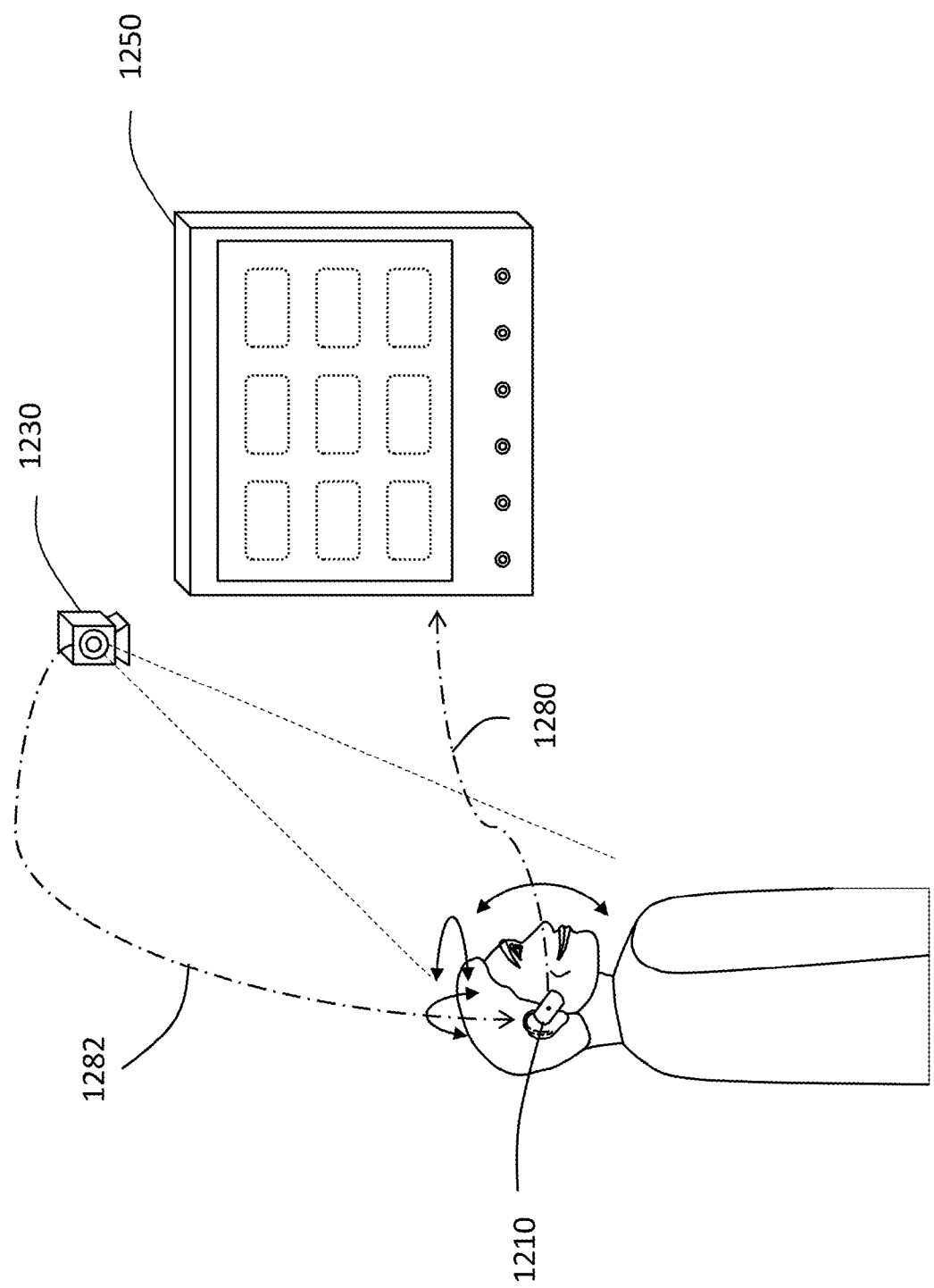
FIG. 23 shows an exemplary embodiment corresponding to schematic representation shown in FIG. 12.

FIG. 12 shows a variation of the Controller where the function of the FE Sensor is performed within an Image Processing System (IPS) 1230 (instead of within the Controller itself). An Image Processing System can include means of acquiring images (such as image sensors and the like), means for processing those images and providing information about those images and their content. In this embodiment, the FE Sensor 1202 includes image sensor (such as a still or video camera, CMOS sensor, CCD sensor, depth sensor, 2D/3D camera, infrared sensor/camera, visible/non-visible electromagnetic radiation sensor, active camera and the like, and/or any combination of various kinds of image sensors) as well as image processing/computer vision algorithms (software and/or hardware) to recognize and extract FE information using the images obtained by the image sensor. As mentioned before, the FE information includes information indicative of various facial expressions such as (but not limited to) data indicating presence/absence and/or strength/level of the facial expression at any given moment of time. The extracted FE information is passed on to Control Software 1220, which is shown to be part of a Controller 1210. The control software 1220 also receives head/body motion data from head/body motion sensor(s) 1204. The Control Software 1220 then applies the requisite heuristics/algorithms (as described in the above mentioned non-provisional US patent application as well as this document) to the FE information and body motion information in order to generate commands to cause Motion of the OOI, Selection and other commands, which are then sent to the controlled Electronic Device 1250. One exemplary scenario where this embodiment can be used is when a user may be using a head based Controller (which in this embodiment has only a Motion sensor) but may be trying to control an electronic device in concert with an Image Processing System (which may already be in place for some other reason). Note that the data flow between all these components can be wired or wireless. FIG. 23 illustrates an exemplary scenario in which the IPS 1230 acquires images of the user and extracts FE information from those images. The FE information 1282 is sent periodically to the Controller 1210. The Control Software 1220 processes the FE information along with the body motion information acquired from Motion Sensor 1204 (not shown in FIG. 23) to generate various commands and information 1280 that are communicated to the Controlled Electronic Device 1250.

Figure 13:
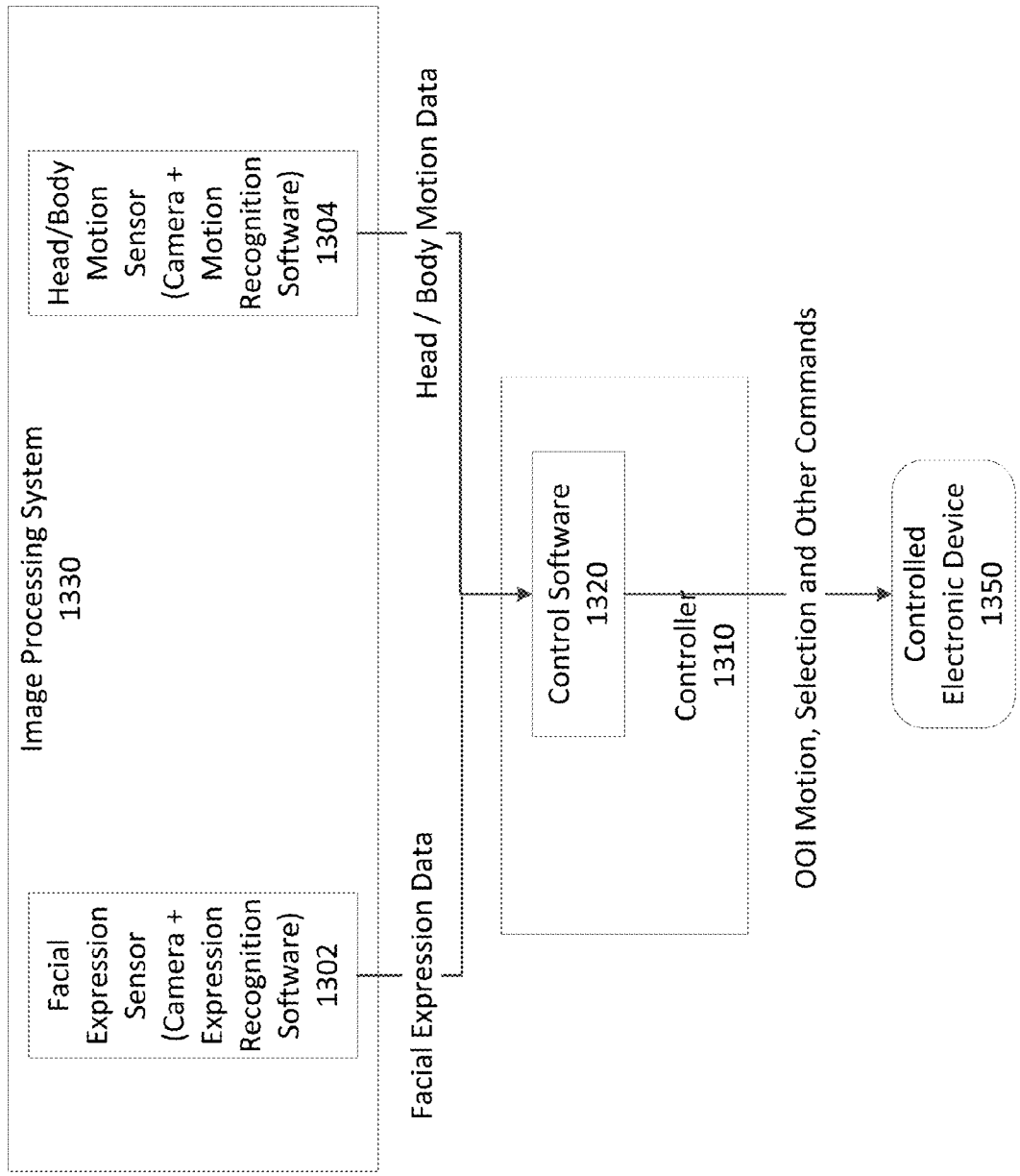
FIG. 13 shows a schematic representation of an exemplary embodiment of a controller where an Image Processing System performs as a FE sensor as well as Motion sensor.
Figure 24:
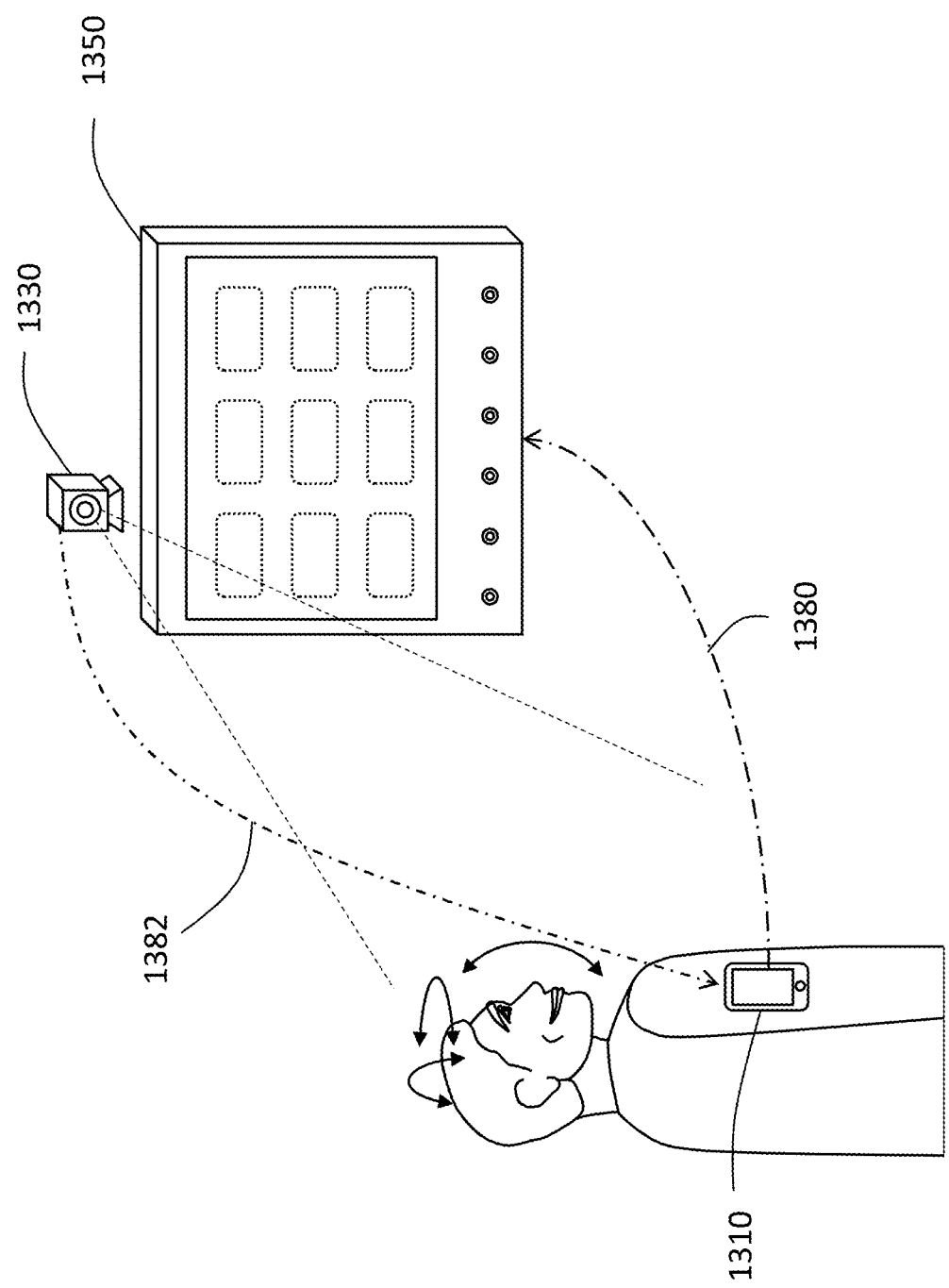
FIG. 24 shows an exemplary embodiment corresponding to schematic representation shown in FIG. 13.

FIG. 13 shows an embodiment of the Controller where functions of the FE Sensor as well as the Head/Body Motion Sensor are performed within an Image Processing System (IPS) 1330 (instead of within the Controller itself). A FE Sensor 1302 includes an image sensor as well as image processing algorithms (software and/or hardware) to recognize and extract FE information using the images obtained by the image acquisition component. The FE information includes information indicative of various facial expressions such as (but not limited to) data indicating presence/absence and/or strength/level of the facial expression at any given moment of time. The extracted FE information is passed on to Control Software 1320, which is shown to be part of a Controller 1310. A Motion Sensor 1304 also includes image sensor(s) that capture images of the user's head/body and calculates motion information using various image processing algorithms (software and/or hardware). Note that the FE Sensor 1302 as well as the Motion Sensor 1304 may share the image sensor(s) as well as any other components (including microprocessors or integrated circuits, software/algorithms, power sources, communication links and others). The Control Software 1320 then applies the requisite heuristics and techniques (such as the ones described in the above mentioned non-provisional US patent application as well as this document) to convert the FE information and body motion information into OOI Motion, Selection and other commands to be sent to a controlled Electronic Device 1350. In one scenario of this embodiment, the Controller 1310 may even be embedded in another device such as a mobile phone that communicates with the IPS 1330 to receive the FE and body motion information and then controls another Electronic Device such as a computer or Smart TV, and the like using bodily motions and facial expressions. FIG. 24 illustrates an exemplary scenario where the IPS 1330 captures images of the user to extract FE information and body motion information 1382 and sends this information to the Controller 1310 which is embedded in the user's mobile device (such as a mobile phone, media player, watch, sports monitor, heart monitor, etc.). The controller 1310 (embedded in the mobile device) then sends commands and other information 1380 to a TV 1350, which is the Controlled Electronic Device in this case. In effect, the user's mobile device works as the controller in this situation.

Figure 15:
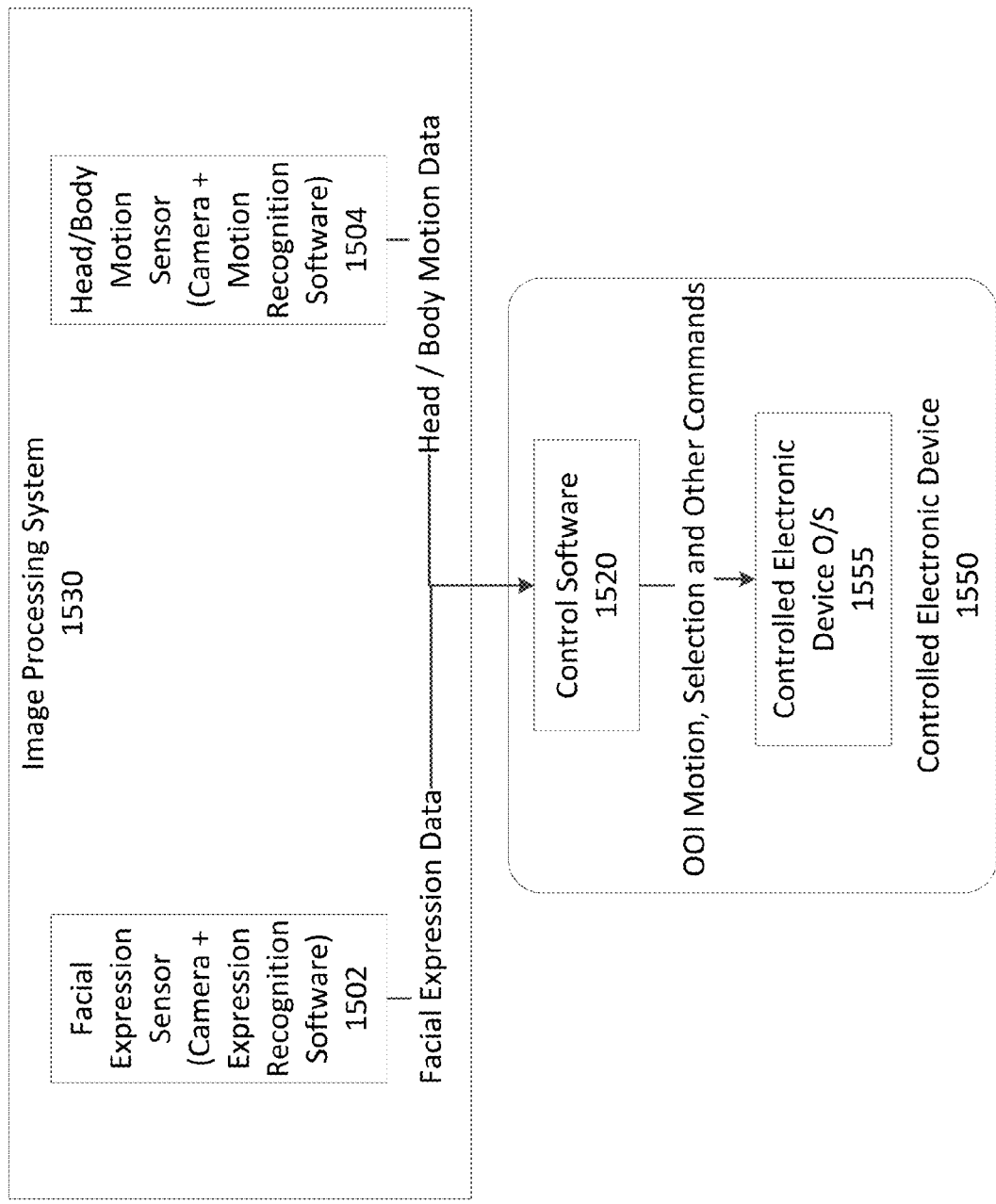
FIG. 15 shows a schematic representation of an exemplary embodiment of a controller where Control Software is included into a Controlled Electronic Device.
Figure 25:
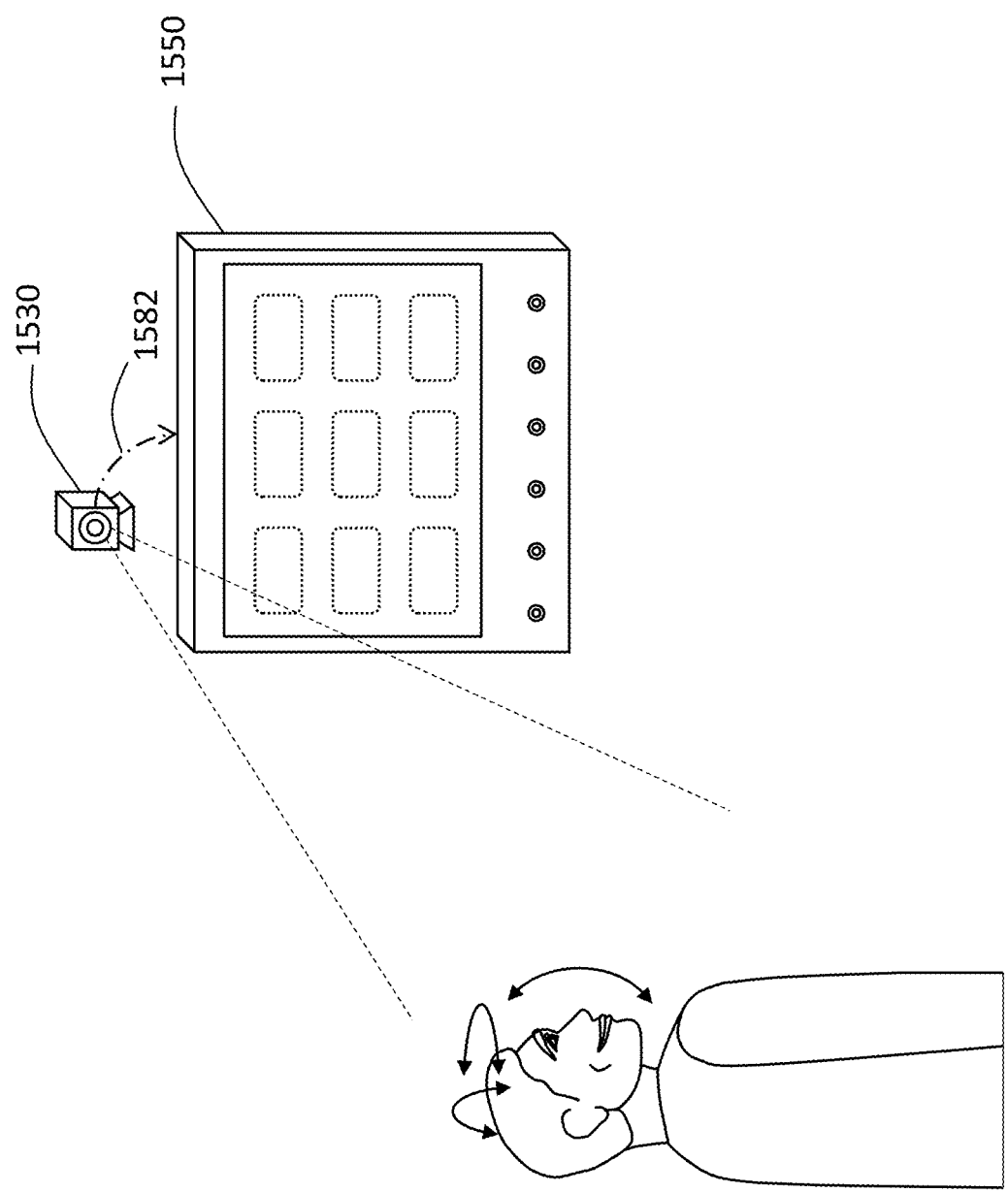
FIG. 25 shows an exemplary embodiment corresponding to schematic representation shown in FIG. 15.

FIG. 15 shows an embodiment that could be considered a variation of the embodiment in FIG. 13. This embodiment shows FE Sensor 1502 as well as Motion Sensor 1504 to be part of the IPS 1530. However, the controller loses its separate identity and is merged with the Controlled Electronic Device 1550. As shown in FIG. 15, Control Software 1520 is included in the Controlled Electronic Device 1550, thereby sending the OOI Motion, Selection and other commands directly to the Operating System (O/S) (and other requisite applications) 1555 running on the Controlled Electronic Device 1550. FIG. 25 illustrates an exemplary scenario with the IPS 1530 processing captured images of the user to extract FE and body motion information 1582 that is sent to the Controlled Electronic Device 1550 (such as a gaming system). The Control Software 1520 on the device 1550 then converts the FE and body motion information into commands and information that it can directly convey to the operating system (O/S) 1555 (or some other appropriate process) on the device 1550.

Figure 14:
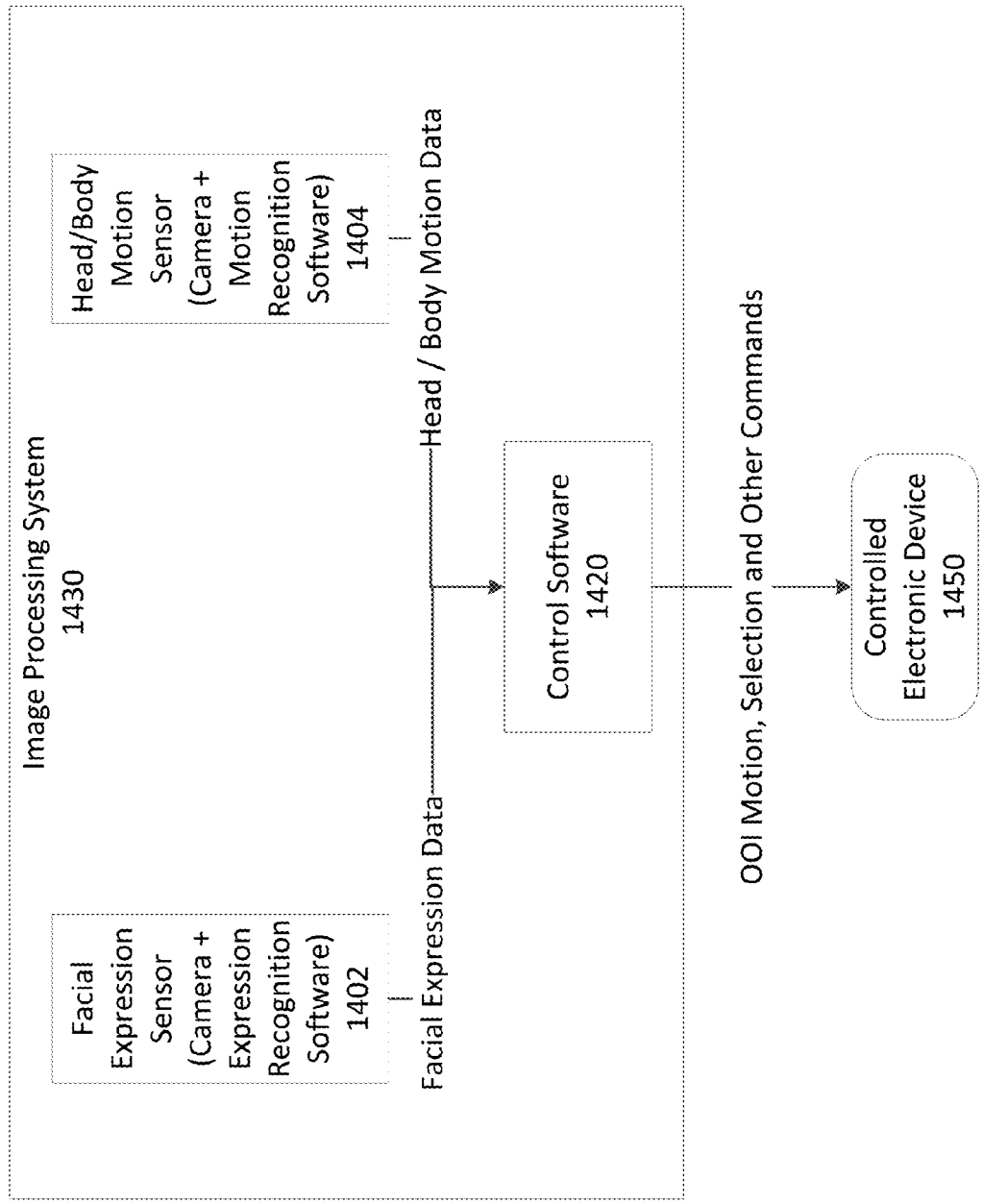
FIG. 14 shows a schematic representation of an exemplary embodiment of a controller where an Image Processing System performs as a FE sensor and Motion sensor as well as includes Control Software.
Figure 26:
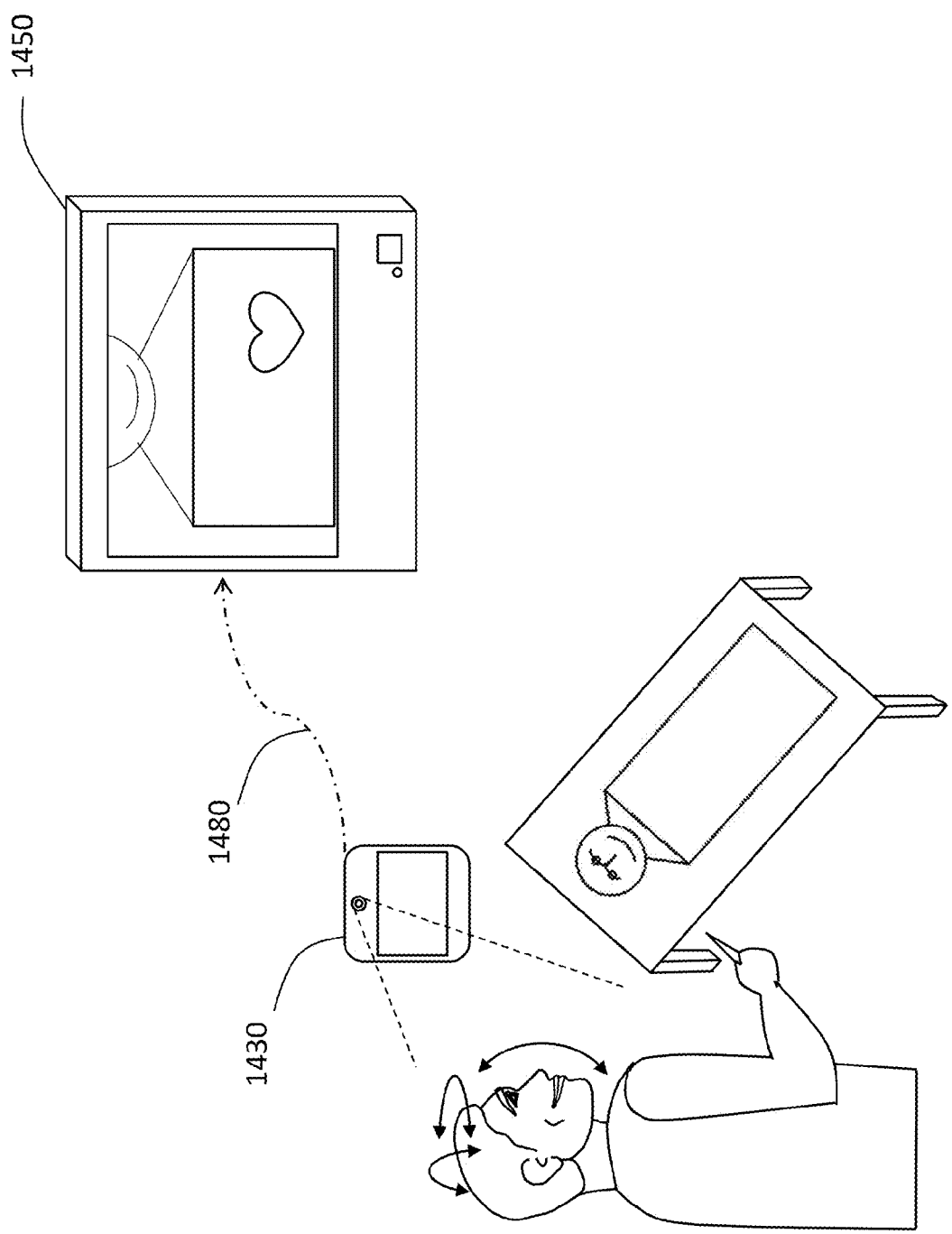
FIG. 26 shows an exemplary embodiment corresponding to schematic representation shown in FIG. 14.

FIG. 14 shows a variation of the Controller where functions of the FE Sensor, Head/Body Motion Sensor as well as the Control Software, are performed within an Image Processing System (IPS) 1430. The IPS 1430 has in effect become the controller in this embodiment. A FE Sensor 1402 includes an image sensor (such as a still or video camera, or a CMOS or CCD sensor or the like) as well as image processing algorithms (running on software and/or hardware) to recognize and extract FE information using the images obtained by the image acquisition component. The FE information includes information indicative of various facial expressions such as (but not limited to) data indicating presence/absence and/or strength/level of the facial expression at any given moment of time. The extracted FE information is passed on to Control Software 1420, which is shown to be part of the Image Processing System 1430. A Motion Sensor 1404 also includes an image sensor that captures images of the user's head/body and calculates body motion information using various image processing algorithms (running on software and/or hardware). Note that the FE Sensor and the Motion Sensor may share image sensors as well as any other components including microprocessors or integrated circuits, power sources, communication links and others. The Control Software 1420 then applies the requisite heuristics and techniques (as described in the above mentioned non-provisional US patent application as well as this document) to convert the FE information and body motion information into OOI Motion, Selection and other commands to be sent to a controlled Electronic Device 1450. In one variation of this embodiment, the IPS 1430 becomes the controller and can be independent of any other electronic device. This way it could be moved around and paired up with electronic device(s) that need to be controlled. In another variation of the above embodiment, the IPS 1430 may even be embedded in another device such as a mobile device, which could be a tablet computer, mobile phone, etc. FIG. 26 illustrates an exemplary scenario where the IPS 1430 is part of a tablet and therefore could use the camera(s) already present on the tablet for capturing images of the user to extract Motion and FE information and then convert them into commands and information 1480 to control an electronic device 1450, such as a medical computer system in an Operating Room (OR). This can allow a user such as a surgeon to use the mobile device to control the OR computer system (for example to display radiology information) in a hands free fashion, even in the middle of a surgery, by simply performing certain head/body motions and facial expressions (such as Smile, Eyebrow raise, frown, etc.) in front of the mobile device (which could be conveniently located in relation to the surgeon and/or the patient).

Figure 16:
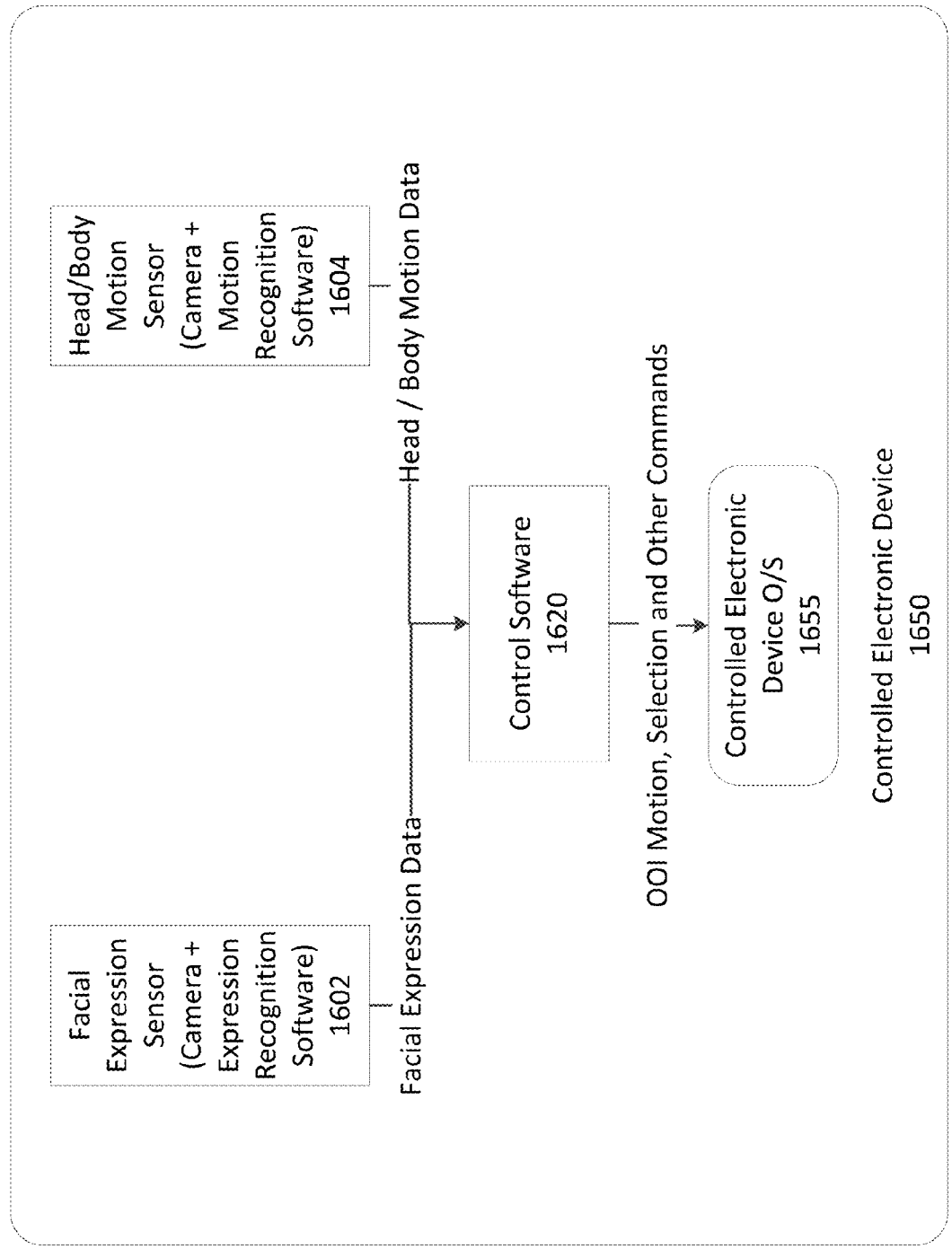
FIG. 16 shows a schematic representation of an exemplary embodiment of a controller where the controller is included in a Controlled Electronic Device.
Figure 27:
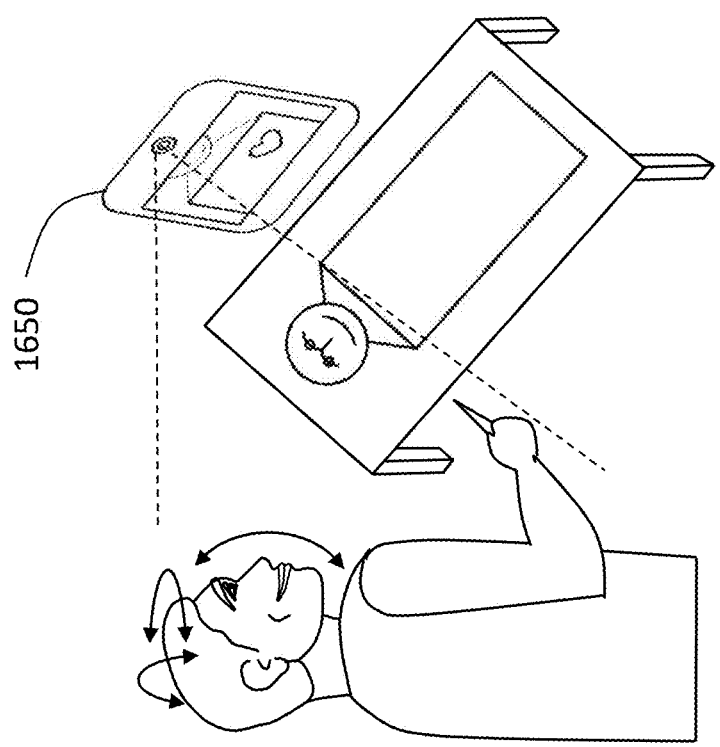
FIG. 27 shows an exemplary embodiment corresponding to schematic representation shown in FIG. 16.

FIG. 16 describes an embodiment that could be considered a variation of the embodiment described in FIG. 14, where the IPS and the Controlled Electronic Device 1650 are merged into one. Effectively, the controller ceases to exist independently and the controlled electronic device can be controlled directly by the user via head/body motions and facial expressions. As shown in FIG. 16, a FE Sensor 1602 as well as a Motion Sensor 1604 are part of the Controlled Electronic Device 1650. Control Software 1620 runs on the Controlled Electronic Device 1650 as well, sending the OOI Motion, Selection and Other commands directly to the O/S and/or other applications/processes 1655 on the Controlled Electronic Device 1650. FIG. 27 illustrates the scenario when the Controlled Electronic Device 1650 is a tablet computer that has camera(s) that are utilized as FE Sensor as well as Motion Sensor. The FE recognition as well as the Motion Recognition can also be done by the tablet computer. Such a tablet computer can be useful to medical professionals operating in sterile environments (such as an operating room) to pull up medical information on a patient in a hands free fashion, even in the middle of a medical procedure. This embodiment process could also be used to control computers (laptop, desktop, tablets, etc.) using facial expressions and head/body motion that is captured by camera on the computer. This approach can also be used in countless other electronic devices. People skilled in the art will also realize that the principles disclosed in this application can be used by not only those embodiments that are realized by single physical devices, but also by those embodiments that are realized by multiple physical devices or in effect system of various devices working together. In other words, some embodiments may be comprised of a single physical (controller) device while other embodiments may be comprised of systems of devices that can act together and perform some functions of a control system.

In some embodiments, the signals generated by the controller can be modified (mapped) by an intermediate process/application as per user preferences or mode/state of the controller/controlled device or based on application(s) running on the operating system of the controlled device. For example, if the controlled device is a PC and the application currently in focus is a flight simulation game, then a mapping process/application running on the PC's operating system can intercept cursor motion signals coming from a controller and convert them into view change signals before allowing those signals to pass through to the flight simulation game. Similarly, selection signals coming from the controller can be translated by the mapping process/application into landing gear control signals. Some embodiments can have this mapping process/application running on the controller itself. Other embodiments can have multiple mapping applications for use with different applications in different situations.

Figure 17:
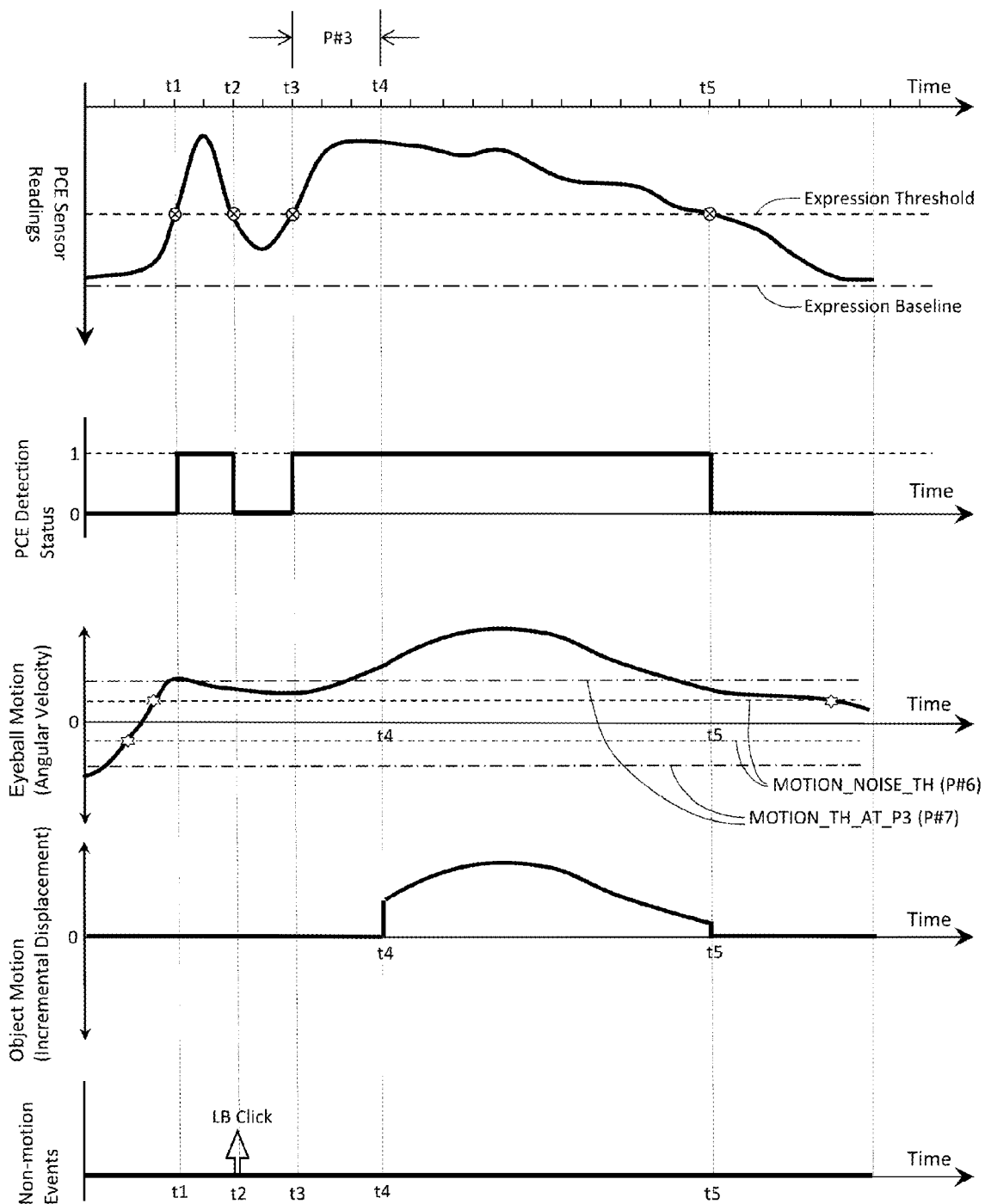
FIG. 17 shows exemplary heuristics for primary controlling expression detection, and object of interest motion and selection functionality with Eyeball motion.

With any of the variations described above as well as other embodiments, one OMD can be substituted for another. In that vein, head motion OMD can be replaced by eye gaze as the OMD. Further, instead of extracting head motion/position information (for example, based on processing of images of the head coming from the image sensors), motion/position information about a user's eyeball(s) can be extracted by using image processing algorithms on the images of head/face/eyeballs/etc. of the user, captured by image sensors. Further, specialized eye or gaze tracking hardware can also be used (instead of regular image sensors such as webcams) to extract the eye gaze and/or body motion information; this includes, but is not limited to Electrooculography (EOG) sensors and other equipment that shine light beams on the eyeballs and measure how they get reflected by the eyeballs. Note that eye gaze information can be used to determine eyeball motion information such as angular velocity, etc. at any given instant of time. This eye gaze and motion information can then be used to drive the OOI motion. FIG. 17 shows exemplary control graphs for an exemplary embodiment. The PCE Sensor reading graph and the PCE Detection status are as explained in the above mentioned non-provisional US patent application. The third graph (from top) shows Eyeball Motion (instead of Head Motion). When using eyeball or gaze tracking instead of head tracking, the values of the parameters P#6 and P#7 (and others) may be different but the heuristics for the OOI motion can still be the same. The OOI motion does not start unless P#3 amount of time is elapsed after the initiation of a Primary Control Expression (PCE) such as a smile, eyebrow raise, jaw drop, frown, mouth open, mouth pout, etc. The motion of the OOI starts at time t4 and then continues in accordance to the motion of the eyeball and terminates when the user stops the facial expression. In another variation, motion of the OOI starts and continues starting at time t4 in accordance with the eye gaze information itself and terminates when the user stops the facial expression (PCE). This means that in this scenario, at time t4, the OOI jumps to where the user is looking at that time. From that time, the OOI continues to follow the gaze until time t5 when the OOI motion is stopped (as the PCE is terminated). If the gaze leaves the bounds of the display screen before time t5, the OOI can stay at the last location within the bounds of the screen till the point in time when the user's gaze comes back to be within the bounds of the screen. If the PCE is still active, the OOI then can start moving in accordance to the gaze, however, other variations are possible where the motion of the OOI is disabled once the gaze leaves the screen and not reinstated even when the gaze returns to be within the bounds of the screen.

Figure 18:
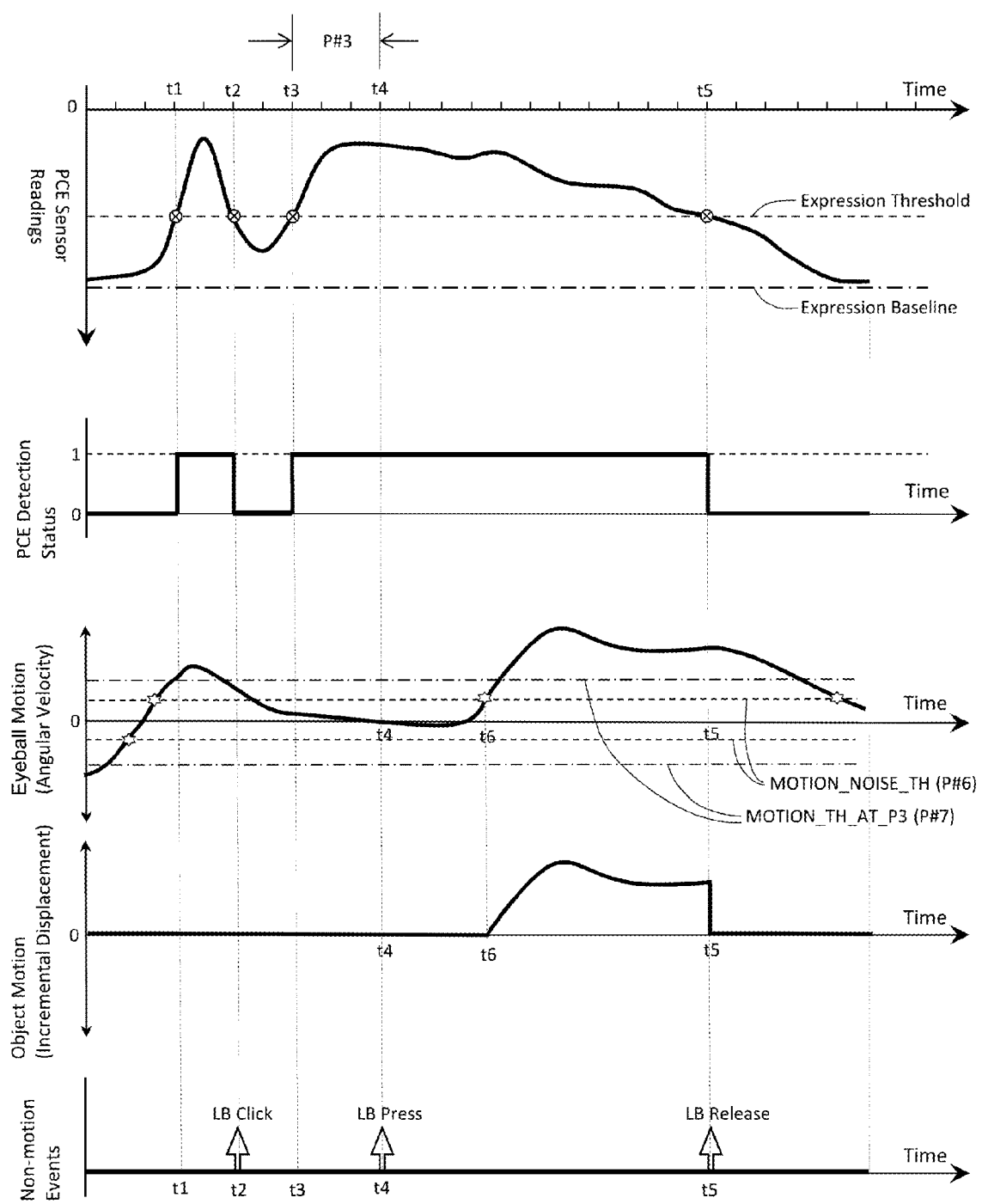
FIG. 18 shows exemplary heuristics for Click and Drag heuristics with Eyeball Motion.

FIG. 18 demonstrates exemplary Click and Drag heuristics with Eyeball Motion as the OMD. The user initiates a PCE at time t3 and then holds the eyeball/gaze steady enough that the absolute magnitude of the eyeball motion (angular velocity) does not exceed the value specified by parameter P#7 (Motion Threshold at time P#3 after PCE start) during the time period t3 through t4. (Variations of this heuristic are possible wherein the threshold check is done only at one/more specific times during the time period t3 through t4.) If eyeball motion during time period t3 through t4 does not exceed P#7 (that is the user's gaze was reasonably steady), then a Left Mouse Button (LB Press) is generated at time t4. (Further variations are possible by checking the cumulative change in gaze direction in the time period t3 through t4 to be within a specified angular displacement threshold, in which case a LB Press event is generated. Similarly, the steadiness of gaze could be ascertained by the user holding the gaze within a specified area on screen, or any location in space for that matter, during the specified time period (t3-t4 in this example). This specified area could be of any shape or size.) OOI motion can start at time t4 and continue in accordance to the eyeball motion until the time the PCE expression ends (shown as time t5 in FIG. 18). Note that similar to the case with head motion, angular motions (of the eyeball) with absolute value less than parameter P#6 can be ignored (as shown during time period t4 through t6 in FIG. 18). In a variation, once the OOI motion is started at time t6, the OOI motions keep in accordance to the latest eye gaze direction (instead of instantaneous angular velocity of eye balls) during time t6 through t5. A LB release event is generated when the PCE is terminated at time t5, thereby completing the Click and Drag process.

Figure 19:
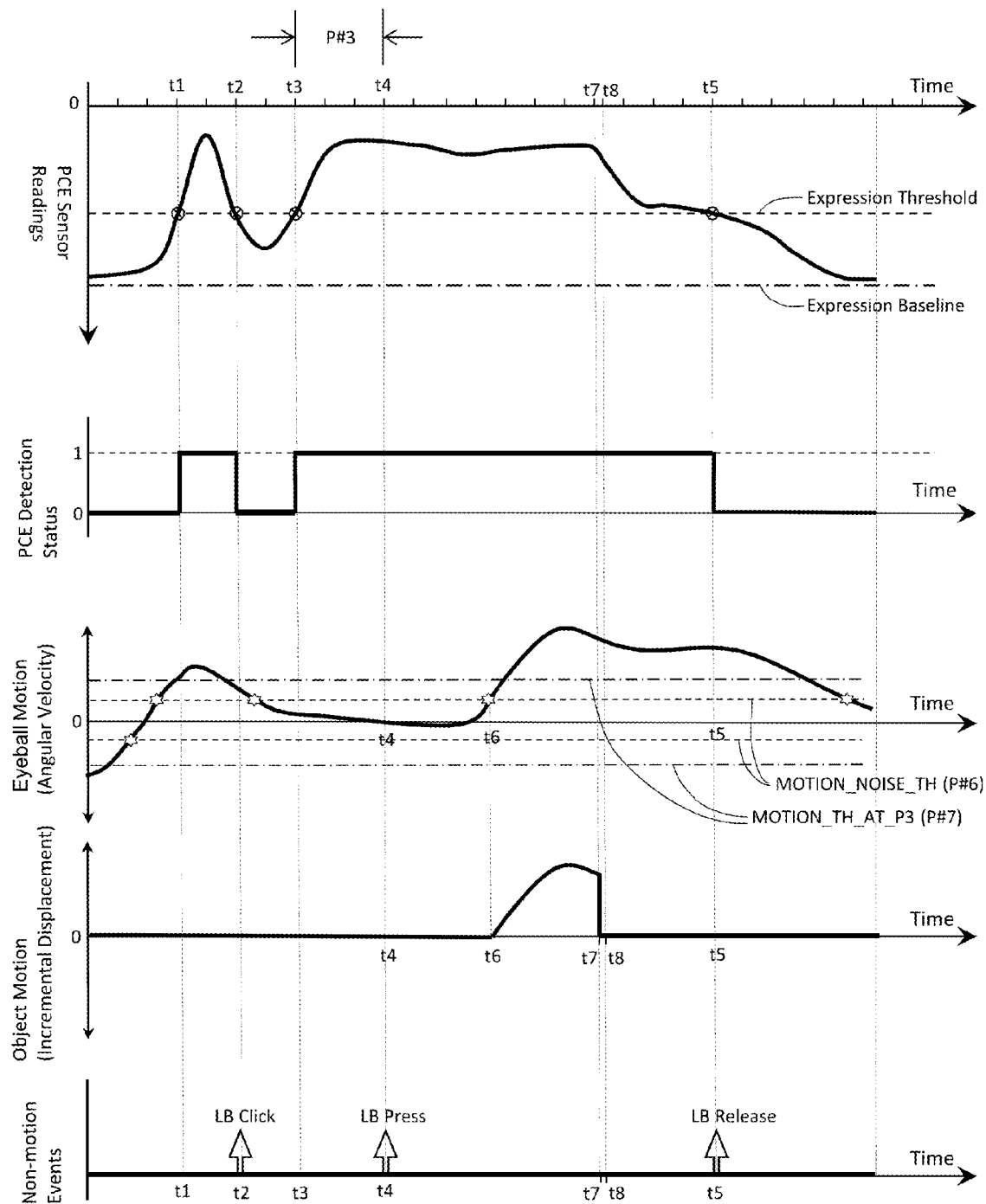
FIG. 19 shows exemplary heuristics for detection of primary controlling expression falling too fast based motion disablement with Eyeball motion.
Figure 20:
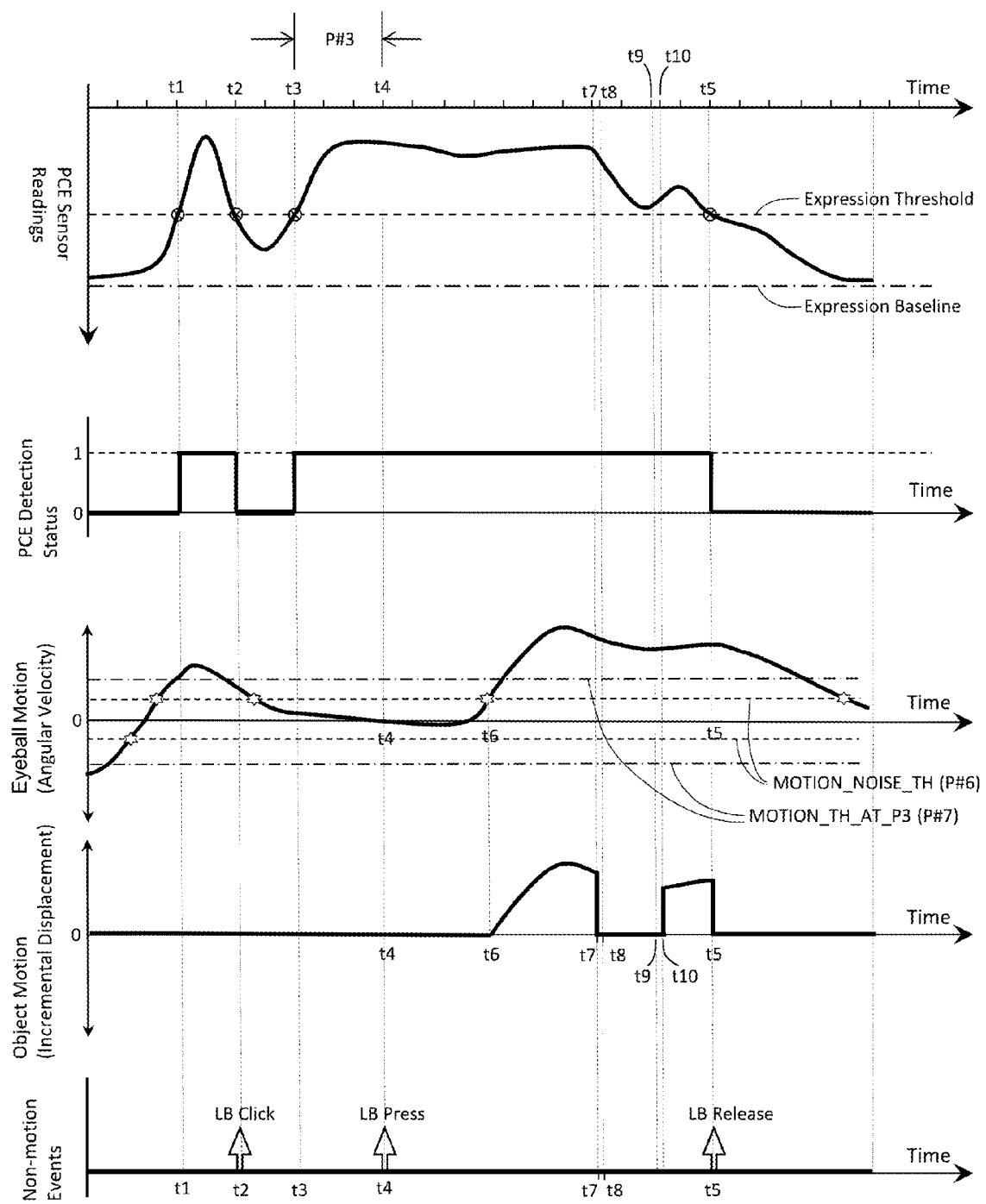
FIG. 20 shows exemplary heuristics for detection of primary controlling expression rising again based motion re-enablement with Eyeball motion.

FIG. 19 and FIG. 20 illustrate the "PCE Falling Too Fast" and "PCE Rising Again" heuristics. These figures are similar to FIGS. 22 and 23 from the above mentioned non-provisional US patent application, except for the use of "Eyeball Motion" instead of "Head Motion". These heuristics are similar except that they are driven by Eyeball Motion versus Head Motion and the differences and variations as described in the preceding paragraphs.

Figure 28:
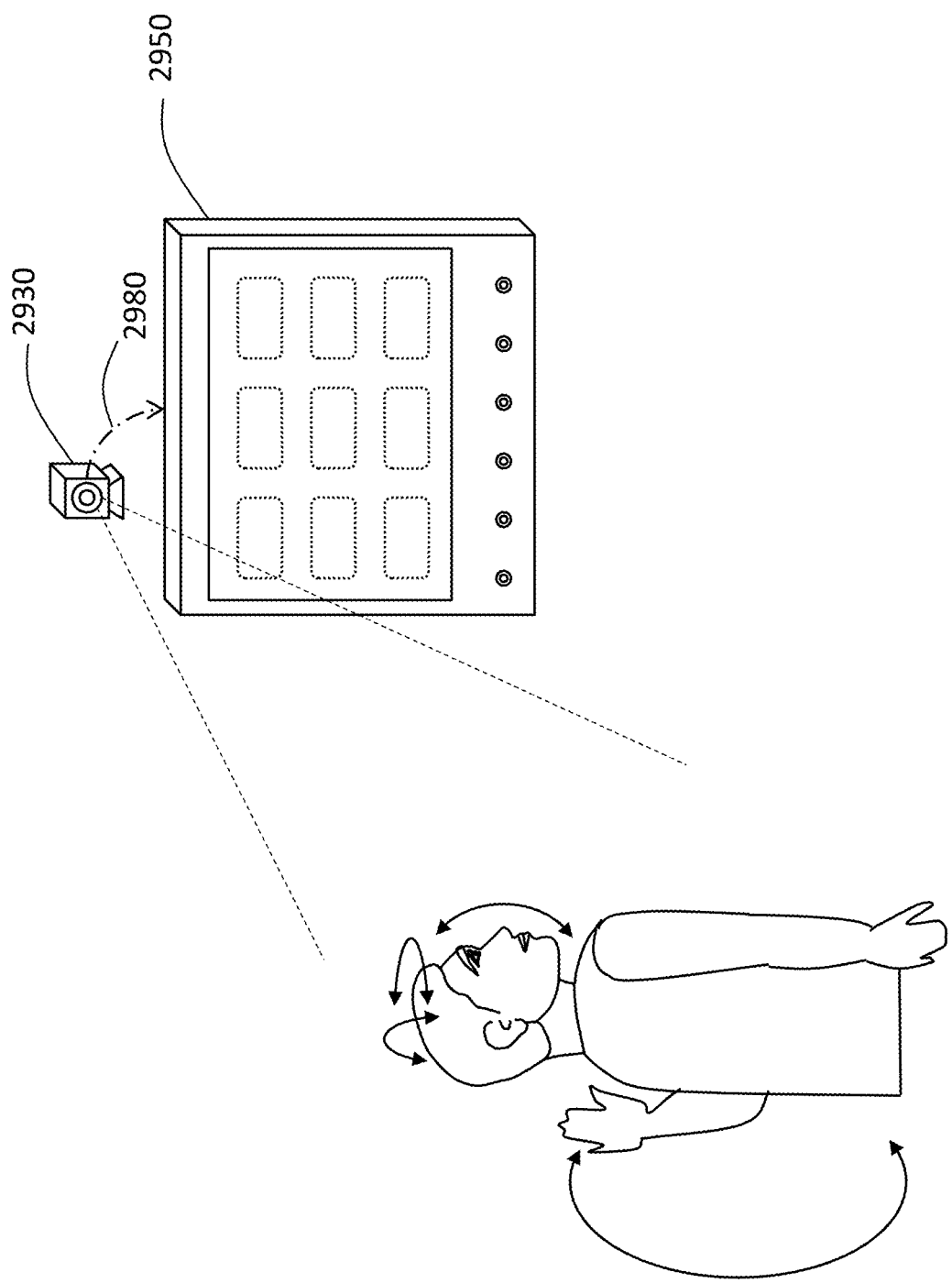
FIG. 28 shows an exemplary embodiment showing Hand Raise as PCM and Head Motion as OMD.

In some embodiments, PCMs could be used in place of PCE. An example is shown in FIG. 28 where raising the left hand can be the designated PCM. This PCM could be detected by image sensors and image processing algorithms (or other Motion Sensors) located in controller 2930 and used as per the heuristics defined in the above mentioned non-provisional US patent application as well as this document by simply substituting PCE by PCM. Therefore, in such a controller/systems that use Image Processing to detect bodily motion, raising and lowering the left hand within proper time interval could cause click (as per the Selection Heuristic). If head motion is the specified OMD, then raising and holding up the left hand and then moving the head can cause OOI motion as per the OOI Motion heuristic. Click and Drag can also be performed by holding the head steady for the specified amount of time upon initiating the left hand raise (i.e. starting the PCM). In a variation of this embodiment, head motion can be substituted by eyeball motion or eye gaze information as the OMD. So in effect, for example, in this embodiment, to move the cursor on the screen, the user could raise their left hand and look at the point on screen where they would like the cursor to move. Other heuristics can also work similarly with the designated PCM (used in place of PCE). In another variation, the user could raise the left hand or Smile (as the PCE or PCM), use eye gaze as the primary OMD to roughly place the OOI and then use their right hand's motions as the secondary OMD to finely tune the placement of the OOI. Note that additional constraints can be added to the secondary OMD, such as a requirement that the hand be at least 60% open, or the index finger be at least be 50% raised, etc., before the hand's motions will be processed as the secondary OMD. Note that the numerical values above are illustrative purposes only.

Figure 29:
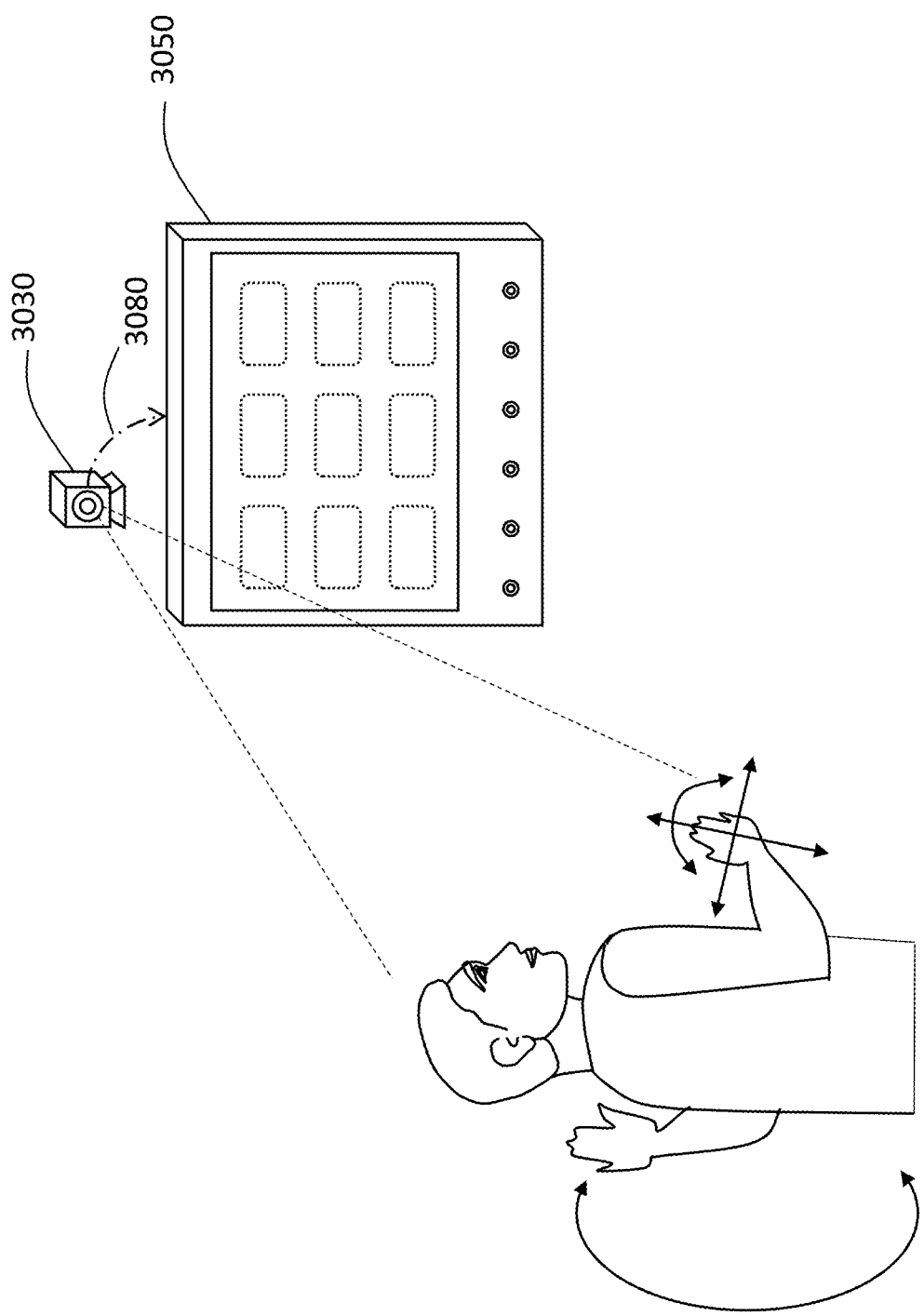
FIG. 29 shows an exemplary embodiment showing Hand Raise as PCM and Hand Motion as OMD.

In other embodiments, one or more bodily gestures could be designated as PCM(s) and other bodily gestures could be used as OOI Motion Drivers. For example, in one embodiment, left hand raise can be designated as the PCM and the right hand could be used for driving OOI motions. Therefore, for example to move the OOI, the user would first raise the left hand (as the PCM) and then move the right hand to make the OOI move in accordance to the motion of the right hand. FIG. 29 illustrates an exemplary scenario where the user is controlling device 3050 by using a controller 3030 with PCM performed by left hand and OMDs performed by the right hand. The controller 3030 extracts the PCM and OMD information by processing the images of the user and provides commands and other information 3080 to the electronic device 3050.

Figure 30:
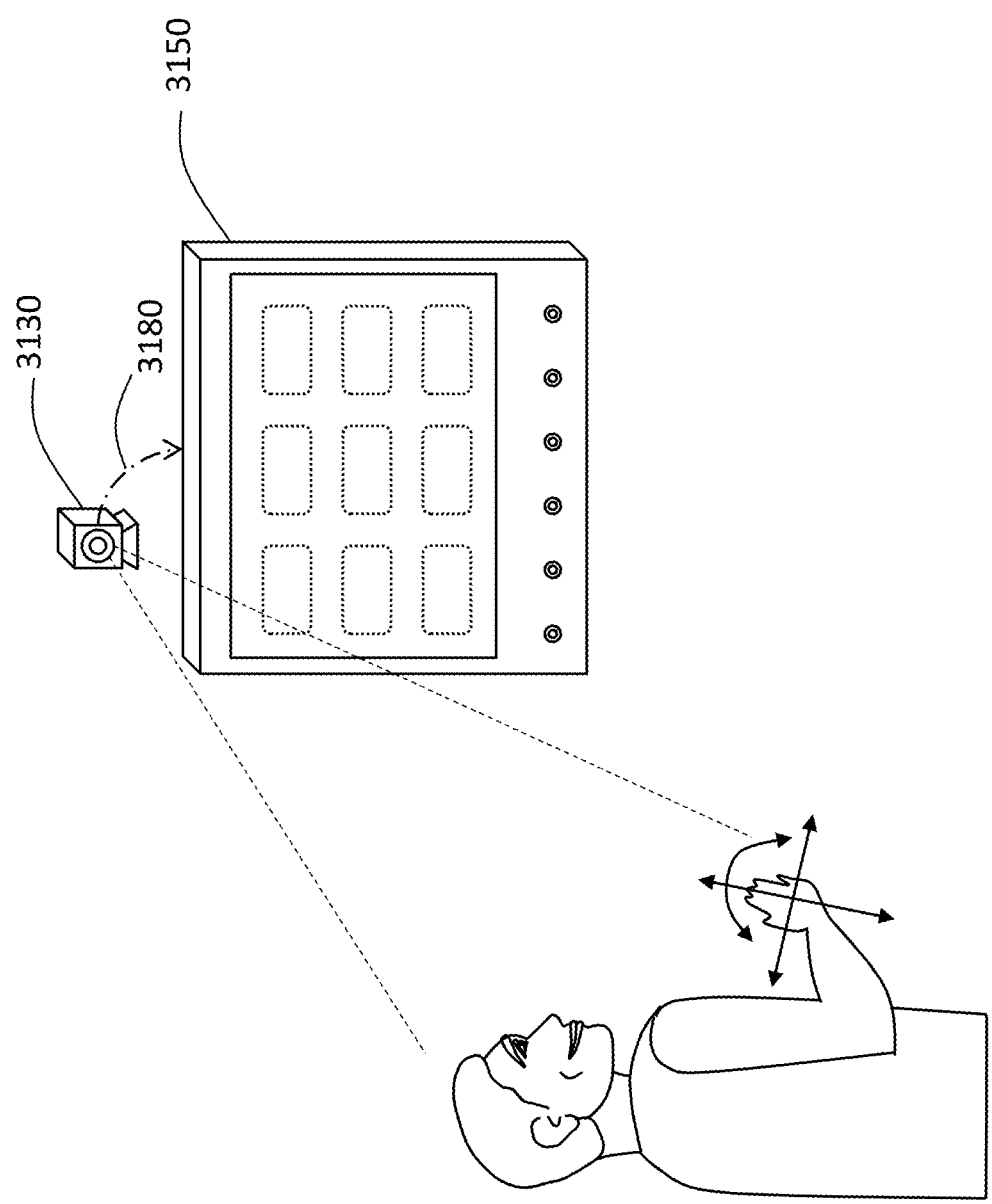
FIG. 30 shows an exemplary embodiment showing Smile as PCE and Hand Motion as OMD.

FIG. 30 illustrates an embodiment where the PCE is the facial expression of Smile and the OMD is motion of the right hand. FIG. 30 illustrates an exemplary scenario where the user is controlling device 3150 by using a controller 3130 with facial expression of Smile as the PCE and right hand motion as the OMD. The controller 3130 extracts the PCM and OMD information by processing the images of the user and provides commands and other information 3180 to the electronic device 3150.

In one embodiment, opening and closing of the hand can be the designated PCM. In this case, when the palm of the hand opens up to particular level of "openness" (designated by an "openness" threshold), that would indicate initiation of the PCM. The user can then start moving the OOI in accordance with a designated OMD. When the user starts closing their palm/hand again so as to cross a second designated threshold of openness, the PCM can be ended. Note that this second threshold of openness could have the same value as the first threshold of openness. However, having two different values for the threshold—one for start of PCM/PCE and another to end the PCM/PCE can provide additional convenience to the user. Following is an illustration of how this can be useful. Let us say that for most users when they are relaxed, we can see only see about 50% of the full inner face (palm and fingers) of their hand, and only 20% of their inner face of their hand is visible when the hand is tightly closed into a fist. Let us assume the first openness threshold (used for starting the PCM) was set to 80%, and the end openness threshold (used for ending the PCM) was set to 35%. Then, although the PCM would start only when the palm opens up greater than or equal to 80%, once the PCM is started the user can relax and leave the palm open in a natural relaxed way at around 50% of openness. This way, once the PCM is started (and thereby the OOI is enabled to move) they can continue to move the OOI for extended amount of time while holding their hand in a natural relaxed stated. When the user wants to stop the OOI motion, the user can end the PCM by momentarily closing their hand sufficiently so as to reduce the openness of their hand to less than or equal to 35% (the second threshold), and after that re-relax their hand into a natural position. Note that, as mentioned earlier, the measure for the level of a PCM can be designed based on suitability for a particular embodiment of the control system. In the above discussion, if an IPS as was being used to monitor bodily actions, then the measure of openness of the hand can be based on the visible size of the hand in proportion to the size of the torso, upper arm, forearm, face/head, etc., as well as the shape of the hand. If the IPS includes only monocular camera then the visible size of the hand is really a projection, thereby, if the hand is not directly facing the camera then the projection of the hand will appear to be smaller than what is in reality. In such case, the level of the PCM can be based on the size visible to the camera versus what is in actuality, thereby allowing the user to effect the PCM without quite opening or closing the hand but rather just by tilting it in relation to the camera.

Figure 31:
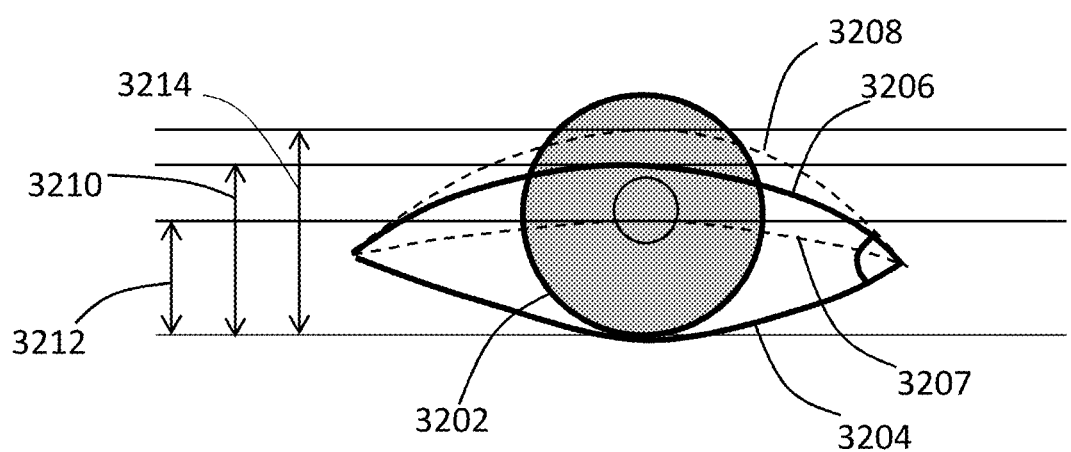
FIG. 31 shows a depiction of an eye with exemplary illustration of eye openness level measurement.

The principle disclosed above can also be used in another variation where changing the opening of an eye (that is motion of the eyelids) is the PCE. FIG. 31 shows a schematic depiction of an eye. Iris 3202, lower eyelid 3204 and upper eyelid 3206 are shown in solid lines and depict the normal positions when the eye is open naturally. Line 3210 represents the amount/level of eye opening when opened normally. On the other hand, Eyelid position 3207 represents the position of the upper eyelid when the user is squinting; line 3212 represents the level/amount of eye opening in this (squinting) position. Similarly, line 3214 represents level/amount of eye opening when the user is opening their eye wide, and eyelid 3208 is the corresponding position of the eyelid (i.e. when eye is wide open). For this example, let us say that the normal level of opening (corresponding to upper eyelid position 3206 and amount/level of opening 3210) for a particular user's eye is 60%. Also, let us say that PCE start (eye opening) threshold was set to 40% (to correspond to squinting upper eyelid position 3207 and eye opening level/amount 3212) and the end opening threshold is set to 75% (corresponding to upper eyelid position 3208 and amount/level of opening 3214). When the user squints their eye(s) to less than or equal to 40% opening, the OOI is enabled to start moving in accordance to the designated OMD (as per the OOI motion heuristics). The user then can stop squinting and continue to move the OOI while keeping their eye opening in a natural relaxed state of around 60%. To disable the OOI motion, the user would open their eye(s) wide beyond the second threshold of 75%, which would then stop the OOI motion, after which the user can return their eyes to a normal state. As can be seen, using two different thresholds for enabling and disabling OOI motion can be helpful in providing additional user comfort/convenience. Note that the above threshold values were just illustrative examples. Different embodiments can use different numerical values for the thresholds. It will be also obvious to persons knowledgeable in the art that a multitude of other bodily actions can also be designated as the PCM or PCE and be used with any OMDs that can include combination of head/body motion tracking as well as eyeball/gaze tracking in any of the heuristics defined in this document as well as the referenced non-provisional US patent application.

In some embodiments, during the time period between the initiation of a PCE/PCM and its subsequent termination, the level of PCE/PCM can be used to affect the behavior of the controller/control system and/or the generated signals. For example, if the PCM is openness of the left hand and OMD is motion of the right hand of the user, and OOI is cursor/pointer on a computer screen and AOI is location of the OOI on the screen, then once the PCM is initiated by opening up the left hand (beyond the start threshold), the level of openness of the left hand can be used to influence the sensitivity of the OOI motion to the OMD. For example, at a higher level of PCM (that is the opening of the left hand), the cursor/pointer can move faster (that is, be more sensitive to the OMD). Similarly, at lower level of PCM, the cursor/pointer motion can be less sensitive to the OMD. In such embodiments, if the PCE/PCM ending threshold is different from the starting threshold, then the level of PCE/PCM can be compared with either the start or the end threshold or a combination of both or any other suitable value for the purpose of affecting the sensitivity (which is an example of behavior of the control system). In a further variation, the variance of this sensitivity of OOI Motion to OMD (in accordance to the level of PCE/PCM) can be initiated after a time period (which can be a predetermined time period) after the initiation of the PCE/PCM. This can allow the user to settle down into a comfortable position before starting to affect the sensitivity using level of the PCE/PCM. In some embodiments, once the PCE/PCM is initiated, the PCE/PCM level can be used to generate signals in accordance with the PCE/PCM level itself (in addition to signals that can be generated in accordance with the OMD). Therefore, in the previous example, instead of modifying speed/sensitivity in accordance to the PCE/PCM level, additional signals such as zoom in/zoom out, rotate OOI about an axis, etc. signals could be generated in accordance to the PCE/PCM level (in addition to cursor/pointer motion signals that can be generated in accordance to the OMD). This can allow the user to zoom in/out or rotate the OOI being displayed on the screen with the left hand as the right hand is controlling the cursor/pointer motion. Smile can also be used as a PCE in the above examples (either as the only PCE/PCM or in conjunction with PCM of hand openness) to affect the behavior of the control system and/or generating additional commands. It will be obvious to persons knowledgeable in the art that multiple variations can be derived by choosing different values and combinations of PCEs, PCMs, OMDs, OOIs, AOIs, signals to be generated in accordance with the OMD and/or PCE/PCM level, attributes/properties/parameters/settings/preferences of some or all parts of the controller/control system to be influenced by PCE/PCM level, etc. when utilizing PCE/PCM level to affect behavior of the control system and/or cause additional generation of signals.

Some variations can have the same body part used/involved while designating PCM as well as the OMD. For example, openness of the user's right hand can be the designated PCM and the motion of the same hand can be the OMD. In this example, when the user opens up their right hand to cross a pre-specified threshold of openness, signals for moving the OOI can start generating wherein the OOI starts moving and continues to move in accordance to the motion of the right hand. These signals can stop generating when the level of openness falls below a pre-specified openness threshold (of the right hand). In another variation, the PCM can be defined based on raising of right hand index finger when all other fingers are curled up in a fist. In this example, as per the OOI Motion heuristics, the OOI can start moving as soon as the index finger is raised (up to at least a specified threshold) from a closed first and the OOI can stop moving as soon as the index finger drops back (as measured by a pre-specified threshold) to a closed first configuration or when one or more other fingers are also raised (thereby straying away from the "closed first with index figure raised" configuration which is the defined PCM). In yet another variation, the PCM can be defined to have one or more fingers raised on a hand (as measured by thresholds defined per finger). In this case, the OOI (such as cursor/pointer) motion can get started when one finger is raised (beyond specified threshold) and as more fingers are raised, the sensitivity of the OOI motion to the hand motion (OMD) can be increased or changed. In this way, the OOI can move greater/lesser amount on the screen based on how many fingers are raised and can finally come to a stop when none of the fingers are raised (beyond their respective thresholds). In further variations, a different OOI can be assigned to each finger, with the level of raising of that finger as the PCM. For example, every finger can be assigned a note of a musical scale as the OOI and the AOI can be the volume of the note. Then, as a particular finger is raised, signals corresponding to playing of the note can start getting generated wherein the volume of a note is changed as per the level of raising of the respective finger.

As disclosed in the above referenced non-provisional US patent application, the user can effect/cause system recalibration, which can adjust the baseline readings for some/all the designated PCEs. In one scenario, the user can force a recalibration when they have a mouth frown on the face or by just having a jaw dropped expression on their face. This can lead to using position of the facial muscles at that instant (of recalibration) as the baseline position for those muscles, and thereby the thresholds can also be computed in relation to that baseline. Therefore, when the user starts using the system, OOI motion can stay disabled as long as they maintain that same expression. However, when they raise their jaw back up to a more natural/neutral facial expression, the facial muscles' position may change thereby causing a trip over the threshold level thereby enabling OOI motion. This can therefore allow the user to move the OOI with a neutral facial expression (that is without a smile or any other expression on their face), thereby allowing for additional flexibility/convenience when performing OOI motions continuously over an extended period of time. The OOI motion can be disabled by returning to the position during the recalibration (that is having their lower jaw drop slightly). It will be obvious to persons knowledgeable in the art that a multitude of other PCEs or even PCMs can be used in a similar fashion to enable prolonged continuous OOI motions with no or minimal PCEs/PCMs.

Further variations of embodiments can be created by using voice recognition commands in conjunction with or as replacement to PCEs. For example, instead of starting a PCE, the user could say a phrase that would start the processing of the OMD, so as to mimic the effect of initiating a PCE. Similarly, the user could utter the same or another phrase to end the processing of the OMD so as to mimic the effect of terminating the PCE. Other voice commands could be recognized without the need to process the OMD to directly trigger any designated commands. For example, user could say "Click" to cause a selection on the electronic device, without having to use any OMD.

In the above embodiments as well as any other embodiments, any number of feedback mechanisms can be used as described in the referenced non-provisional US patent application. For example, in the scenario described in one of the previous paragraphs, when the user raises and quickly lowers their left hand (as the PCE), audio/video feedback can be provided to indicate detection/initiation and termination of the left hand raise motion (the PCE). Further, based on the time taken for that action (that is the time between initiation and termination of the left hand raise motion), it can result in a click as well as an audible/visible feedback signifying a click be provided to the user.

Some embodiments can have sensors that can detect if the user is wearing the controller. They can have touch, proximity and other types of sensors that help detect if the user is wearing the device and if so, determine if they are wearing it correctly. FIG. 18 from the above referenced non-provisional US patent application shows one such embodiment. This sensor information can also be used for power management functions. For example, the embodiment can go in a low power mode when it senses that the device is not being worn and revert to normal power mode when it is being worn. Upon further passage of time without wear, the system could go into even a deeper level of power conservation. Motion/Inertial sensors can also be used in isolation or in conjunction with the sensors being used for wear detection for purpose of power management. For example, one embodiment can go in a low power mode even if it is being worn but there is not sufficient motion for a certain amount of time. Normal power levels can be restored when sufficient motion is detected.

Alarms can be triggered based on input from various sensors. Some embodiments may actually trigger alarm(s) (audio, visual, tactile, olfactory, email, text message, communication to another electronic device to trigger specified action(s), etc.) if it is detected that a user is wearing the device but not moving sufficiently for a certain amount of time. This could be used for drowsiness detection (e.g. when user is driving or operating machinery, etc.), health alert (e.g. user is motionless even while wearing the controller properly) or even for fitness purposes (e.g. user wants to do some physical activity after every so many minutes of deskwork). The user can set the level of desired physical activity (via a suitable user interface or configuration setting or any other mechanism), which if not detected (possibly within a specified amount of time), can trigger the alarm(s). The system can also provide appropriate default values for the required level of physical activity (corresponding to different types of desired alarm functions), the lack of which may trigger alarms. The reverse alarm conditions may also be used. For example, if the user is a patient staying in a hospital and is supposed to get rest, alarms may be triggered if the user is moving more than the level of specified motions within the specified time period, while simultaneously wearing the controller in a proper fashion.

Facial expressions and bodily motions can also be monitored via sensors worn inside a user's body orifices or body cavities. The body orifices/cavities can be natural or artificial. Such sensors can monitor properties such as shape, temperature, pressure, skin-conductance and/or other physical or biometric properties of or inside the body orifice/cavity. Based on the changes of these properties, the sensor(s) can detect presence of facial expressions and/or other bodily actions performed by the user. For example, when a user smiles, winks, sticks tongue out left or right, opens or closes the mouth, moves eyes left or right, or performs other expressions, the shape of his/her ear canal cavity changes. These shape changes can be detected by sensors such as optical sensors, infrared photo reflective sensors and the like. Other types of sensors such as acoustic sensors, FGB optical fiber sensor, pressure sensors, stress sensors, piezoelectric sensors, EMG (Electromyography) sensors, GSR (Galvanic Skin Response) sensors and others can also be used to monitor shape or other properties/attributes of the cavities as well as other bodily information around the cavities. Readings from these sensors then can provide indication of presence and magnitude/level of the facial expressions or other bodily actions being performed by the user. (Note that readings from multiple sensors can be gathered and evaluated together in concert with each other for the purpose of detection of facial expressions and/or other bodily actions.) Monitoring of properties of/inside a bodily orifice/cavity can therefore be used to detect facial expressions as well as other bodily actions that can then be used as PCEs or OMDs in user gestures to control an electronic device. Note that some embodiments can use sensors to monitor some of the above mentioned properties (such as skin conductance, stress/strain, temperature, etc.) even without being inside any bodily orifice/cavity.

Several different techniques/algorithms/functions for deriving the indicator of expression level based on positions of multiple points/areas of interest on the user's face can also be used. Some Computer Vision/Machine Learning techniques encode the image of portions of a face as a vector of real-valued numbers that are integrated into a single real-valued number which is then thresholded to classify the image as showing a particular expression or not. The "indicator of level of expression" then can be derived as a function of such a single real-value number or as a function of the difference between this "single real-valued real number" and the threshold (that was used for classification of the image). Algorithms that use Support Vector Machine (SVM) techniques can also use the distance to the margin of the SVM output as an "indicator of level of expression". Indicators such as likelihood ratios (such as log-likelihood ratios output by GentleBoost technique using Box Filters & Edge Oriented Histograms, and/or other algorithms) can also be used to measure the level of expression. Any such "indicators of level of expression" can be used as (that is in place of) "PCE Sensor reading" in any of the heuristics explained in this as well as other referenced or referencing documents. Similarly, change in "indicators of level of expression" can also be used as "PCE Sensor reading". As suggested in paper by Paul Viola and Michael Jones, titled "Rapid Object Detection using a Boosted Cascade of Simple Features" (accepted in Conference on Computer Vision and Pattern Recognition, 2001), cascade classifier can be designed/trained to detect objects such as various parts of the face (such as mouth, etc.). Further, those classifiers can be trained to detect the part of the face only when a certain expression is active. For example, a classifier can be trained to detect only a smiling mouth and not a mouth in a neutral or frowning or puckered position, thereby facial expressions can be recognized using such classifiers. Furthermore, the detectors using such classifiers can give an indication of the intensity of the facial expression. For example, when detect/measuring a smile, the detector can count the number of candidates found (in the image of a human face) for instances of a smiling mouth. Higher the number of candidates found, higher the intensity of the smile. This number of candidates then can be used (directly or used to derive a quantity that can be used) as a "PCE Sensor Reading" that can be used in various heuristics.

Note: Refer to following reference and references therein for more details of Computer Vision/Machine Learning techniques/algorithms that can be used for detecting Smile and other Facial Expressions—

"Toward Practical Smile Detection" by Jacob Whitehill, Gwen Littlewort, Ian Fasel, Marian Bartlett and Javier Movellan, published in IEEE Transactions On Pattern Analysis and Machine Intelligence on November 2009 (vol. 31 no. 11), pp. 2106-2111.

OpenCV documentation—http://docs.opencv.org/2.4.5/modules/objdetect/doc/cascade_classification.html.)

Note: It will be obvious to persons skilled in the art that any of the above mentioned or referenced image processing/computer vision/machine learning or other algorithms can be used on static images/photos/image files or on video frames extracted from video information obtained from live camera/image sensor/depth sensors/range sensor etc. feeds, movie files, or any other sources.

Combinations of PCEs and/or PCMs can also be used simultaneously/concurrently to control an electronic device. In one embodiment, raising of eyebrows as well as smiling action can be both designated as PCEs. In this case, when the user smiles quickly as per the Selection/Click heuristic disclosed earlier, it can lead to a Left Mouse Button click event. Further, if the user also raises eyebrows while performing the smile, or already had the eyebrows raised when performing the smile, that can be interpreted as a Right Mouse Button click. Similarly, if eyelid motion (that is action of opening/closing the eye) was a PCE as well, then performing the quick smile while squinting an eye(s) can be mapped to the Shift-Click command. In another variation, the PCE of eyebrow motion can be designated to cause to repetition of generated signals. In this case, when a user does a Click with one smiling action (as described in the Selection heuristics), having the eyebrows are raised during the smiling action can cause click signals to be repeatedly generated (after specified time intervals) until the eyebrows return to the normal position (or cross a specified threshold on their position). It will be also obvious to persons knowledgeable in the art that a multitude of other combinations of PCEs and/or PCMs can be used affect the behavior of the control system and/or to generate additional signals for control of/communication with/consumption by electronic device(s).

Some commands can be mapped to simply one single action such as performing a PCE. For example, squinting the eyes so as to decrease the level of eye opening below a specified threshold can initiate a zoom-in command on the current window on the display of a computing device. Please refer to FIG. 31. As explained earlier, eye opening amount 3210/eyelid position 3206 indicates normal position. When the user squints so as to make the eyelid position/eye opening amount fall below a threshold position/level (say for example one designated by position 3207/amount 3212), after passage of certain minimum required wait time (during which no commands are issued) zoom-in command can be issued. Further, continuing to hold the squint can cause additional zoom-in commands to be issued at regular or variable time intervals. The zoom commands can cease to be issued when the user's eye opening level/amount (or eyelid position) goes back to be above the specified threshold (which is position 3207/amount 3212 in this example). Similarly, eye opening level/amount 3214 (or eyelid position 3208) can be designated to be a threshold for zoom-out command. In that case, when the eye opening is increased to be more than threshold position/level 3214 (or eyelid position 3208), after passage of certain minimum required wait time (when there are no zoom commands issued), the system can issue zoom-out command. Further, continuing to hold the eye opening to be greater than the specified zoom-out threshold can cause additional zoom-out commands to be issued at regular or variable time intervals till the eye opening falls below the zoom-out threshold opening level 3214/position 3208. The length of the (variable) time interval between firing of two commands can be made to depend on the amount of eye opening. For example, the time interval could be a function of the amount by which the eye opening amount exceeds the threshold amount. In another variation, scroll up/down commands can be issued instead of the zoom in/out commands. It will be also obvious to persons knowledgeable in the art that a multitude of other commands can be issued based on combinations of PCEs and/or PCMs that can be created and mapped to various different commands to control electronic devices.

A variety of feedback can be given to the user with regard to their being in a OOI motion enabling pose/position and the amount of time elapsed/remaining before the OOI Motion is actually enabled. Such feedback can be visual, auditory, haptic, olfactory or any other suitable mechanism. In general, feedback can also be provided on any/all aspects of various concepts and components (such as PCE, PCM, OMDs, ODEs, etc.) used in interaction with electronic devices. Visual feedback can include indicators, progress meters, change in shape/size/color/texture/behavior/etc. of graphical objects, creation/deletion of graphical objects (based on the state, amount, direction or any other property of PCE, PCM, OMD, ODE, etc.) As an illustration, when a PCE or PCM is initiated a sound signal can be generated as an indicator of that fact. A graphical icon can also be displayed on a display associated with the electronic device or an existing graphical icon be changed in appearance when a PCE/PCM is initiated. Further, as the PCE/PCM progresses, the sound signals can change and/or the graphical objects can change to provide an indication of the amount of time passed since the initiation of the PCE/PCM, the level/amount/direction of PCE/PCM, as well as feedback can also be provided on the OMD itself. The indicators can provide an indication of progress towards the upcoming time milestones/thresholds. For example, once the PCE/PCM is initiated, the indicators can provide an indication on how much time remains before a time duration threshold is reached, wherein meeting the time threshold results in generation of signals that are different from signals that are generated when the time threshold is not met.

Some embodiments can use information/input provided by physical input mechanisms instead of PCEs/PCMs information (provided by various PCE/PCM sensors) while using the heuristics described herein as well the above mentioned patent applications. For example, a "button" (push button or a touch sensitive surface on the controller on the electronic device or any suitable input mechanism in communication with the controller and/or the electronic device) could be used to provide information that can be used in place of the PCE/PCM information (in any of the heuristics described here or the above mentioned patent application). Therefore, as an illustration, if the controller embodiment looked like eye glasses and if part of those eyeglasses were made sensitive to touch, then whenever the user touched them, that presence of touch could be treated as equivalent to presence of a PCE and lack of touch could be treated as absence of PCE. Alternatively, a physical button could be provided on the controller, which when pressed indicate presence of PCE and lack of depression of the button could be treated as absence of PCE. Further, these input mechanisms could also provide information about the intensity/strength of touch or depression, which can also be used as described in the heuristics.

Some embodiments can change or activate/deactivate usage of gain curves based on user preference or usage scenarios. For example, if the user intends to draw sketches on the controlled device, a gain curve with larger linear portion may be favored over a more sigmoidal looking gain curve that may be preferable for normal OOI motion/placement. The gain curves can be changed based on explicit user directive or automatically based on certain triggers. For example, consider a use of a drawing or painting program (such as Paint program from Microsoft Corp.) on a computer. To make a free hand sketch, the user has to take two steps. First the user has to place the pointer precisely at the desired location. Then, he/she uses a Click and Drag command to move the pointer in a desired trajectory to sketch a freehand curve. In such situations, for the first step, a gain curve that allows quick and precise location of the pointer (without much attention to the trajectory of the pointer) can be used. The gain curve for this first step can be sigmoidal in shape. For the second step of actually performing the sketch, right after the Click and Drag is initiated the gain curve can be switched to one that is more linear in shape. That can allow more precise control on the trajectory of the pointer and thereby the shape of the sketch being created. This approach of using different gain curves during different commands or user gestures can be implemented without regard to which program is being run on the controlled electronic device. So, for example, if cursor/pointer control is being performed on a computer, then the gain curve used when performing Click and Drag user gesture can be always made to be different than when the user is just moving the cursor to a desired location, without regards to which specific program is being run on the computer.

The explanations of figures in this application as well as referenced application use the phrase "crossing threshold" to be synonymous with the phrases "reaching a threshold" or "leaving a threshold". For example, in some embodiments, if a PCE Sensor reading was below an Expression Threshold, then the point in time when it reaches the Expression Threshold can be treated as the point in time when the PCE can be considered to have started. Further, if after that point the PCE Sensor reading drops back below the Expression Threshold, that event can be considered to signify termination of the PCE. Some embodiments can have a first Expression Threshold designating the start of a PCE and a second Expression Threshold designating the stop of the same PCE. In such cases, the PCE can be said to have started when the PCE sensor reading either reaches or crosses the first designated Expression Threshold, and the PCE can be said to have ended when the PCE reading reaches or crosses the second Expression Threshold. In some embodiments, where PCE/PCM Sensors can provide only a few discrete reading values, (for example, only two values), then PCE/PCM can be said to start when the PCE/PCM reading changes from a first value to a second value, and the PCE/PCM can be said to end when it the PCE/PCM reading changes from the second value to the first. Thus, in this case, the mere change in value (that is leaving of a level), can be treated as "crossing" a level.

Facial Expressions Management (FEM) can include monitoring and detection of facial expressions of the user as well as other AEGS performed by the user (which can include PCEs and PCMs). Note that some FEs can also be performed as AMPs. FEM can also include storage, processing and reporting of AEGS as well as AIAGS information. This can include type, magnitude, direction, duration and time of occurrence of each occurrence of AEGS or AIAGS as well as other calculated derived AEGS and/or AIAGS information. The raw occurrence information and/or derived information can include total counts and duration of various types of user actions, average and median durations, variation of counts and durations of various actions over a time period (such as hour, day, week, etc.). Reports can be provided based on raw as well as derived information. For example, reports can be provided at the end of the day about how many times the user smiled during the day, how long was the median smile duration, the average or median smile intensity, an hour by hour variation on number of smiles, average/media duration of smiles, standard deviation of duration of smiles and intensity of smile over the day, etc. Such reports can be useful to consumers as smiling action can be considered to be beneficial to health. They can be also useful in corporate settings, for example in call centers, where it is desirable to have customer service representatives smile while speaking with customers. Such facial expression information can be compared across individuals or teams/groups as well as correlated with their productivity/ performance.

Information gathered as part of FEM can also include information on the types and numbers of generated signals that were invoked by using actions such as AEGS. For example, raw information can be collected on amount of OOI motion performed via user gestures (in number of pixels, screen distance or other measures), so that at the end of a time period or a work session, the user could be notified on how much distance of OOI motion was achieved using user gestures. Such information can be educational as well as motivational to the user. Information on user action such as eye gaze (which can be an AIAGS) can be gathered to provide an indicator of user attention while working with a computing device. For example, a report indicating the proportion of on screen and off screen eye gaze during a work day can provide patterns of user attentiveness during the day. Further, the AEGS information accompanying the AIAGS information (eye gaze in this example) and/or generated signal information can provide further insight into user attentiveness and productivity. Further, this information can be categorized on an application by application basis. Note that FEM can still be done without generation of any signals. For example, information on user's facial expressions can be collected during usage of certain computer applications; such information can lead to insights into user satisfaction with an application. Some or all the information can be collected, saved and reported on a user by user basis as well as application basis.

FEM can be used for social media purposes as well. For example, updates can be provided to friends, family, employers, doctors, peer groups, etc. upon certain time intervals or when certain events occur. In one embodiment, updates on how often and how long a user smiled during a day can be provided (possibly automatically) to friends, etc. as part of a competition or game. Such games can encourage smiling and thereby help with mental and physiological well-being. In variations, the distances traversed by OOI, number of clicks, count of facial expressions performed, durations of FE, etc. can be used as indicators of the user performing specific FEs of interest. This information can be used in games, friendly competitions and other purposes. Just as people can compare how many miles they walk or run on a regular basis with their peers, the information obtained from FEM can be used to encourage, share, and compete with others as well as for self-motivation. Further, the information captured as part of FEM can be used to capture "Happiness Index" for a user on daily, weekly, monthly, etc. basis. In one example, the cumulative duration of all smiles performed during a time period (such as one day) can be compared with other facial expressions such as frowns can be compared to derive relative proportions, percentages, etc. which can be used as indicators of happiness.

Note: The information gathered as part of FEM can be stored in any part/parts of the control system including the controller, sensors, as well as the controlled device itself.

As mentioned in the above-mentioned non-provisional US patent application, any of the commands (listed above or otherwise) can have different result on different electronic devices. While in the above embodiment the controller generates signals for consumption by a computer, other embodiments can generate signals for devices such as home media centers, washing machines, microwave ovens, smart TVs, etc.; thereby the interpretation and result of each of the commands can be different for those devices, although the concepts/principles/heuristics for generating those commands are the same.

It will be obvious to persons knowledgeable in the art that the principles and heuristics described herein can be used regardless of the method/type of sensors/hardware/algorithms used (to detect and measure body motions), type of facial expressions or facial muscle movement or other bodily actions (that can be used as PCEs/PCMs/OMDs/AEGS/AIAGS and/or used to perform ODEs/POLAs). These principles and heuristics can also be employed to generate different and/or additional control signals (and their combinations) compared to the control signals (and their combinations) mentioned in this and referenced application (s). Various bodily actions/concepts/principles described can be combined together to obtain multitudes of variations/embodiments.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

I claim:

1. An apparatus for a user to use to communicate with an electronic device, the apparatus comprising:
   memory;
   a processor that receives facial expression (FE) information indicative of one or more facial expressions performed by the user, and that receives body information indicative of motion or position of one or more body parts of the user, said body information being distinct from said FE information; and
   an inertial motion sensor providing at least a portion of said body information;
   wherein said processor starts generating first signals to modify an object of interest (OOI) on the electronic device when an active facial expression is detected based on said FE information, said first signals being based on said body information; and
   wherein said processor stops generating said first signals when said active facial expression is no longer detected.

2. The apparatus of claim 1, wherein said processor generates a selection signal when said FE information crosses or reaches a first threshold, wherein said selection signal is distinct from said first signals.

3. The apparatus of claim 1, wherein said apparatus further comprises a FE sensor providing at least a portion of said FE information.

4. The apparatus of claim 3, wherein said FE sensor comprises a proximity sensor.

5. The apparatus of claim 3, wherein said FE sensor comprises a touch sensor.

6. The apparatus of claim 3, wherein said FE sensor comprises a sliding motion sensor.

7. The apparatus of claim 3, wherein said FE sensor comprises a body orifice sensor.

8. The apparatus of claim 3, wherein said FE sensor comprises an image sensor.

9. The apparatus of claim 3, wherein said FE information is information indicative of touch between said FE sensor and said one or more facial muscles of the user.

10. The apparatus of claim 3, wherein said apparatus is part of a device worn on the user's head.

11. The apparatus of claim 10, wherein said device worn on the user's head is in the form of eyewear.

12. The apparatus of claim 10, wherein said apparatus further comprises a motion sensor that provides at least a portion of said body information.

13. The apparatus of claim 10, wherein said apparatus is integrated into the electronic device.

14. The apparatus of claim 3, wherein said FE sensor senses at least one of sipping or puffing action performed by the user.

15. The apparatus of claim 1, wherein said apparatus further comprises an image sensor providing a portion of at least one of said FE information and said body information.

16. The apparatus of claim 1, wherein said apparatus further comprises an eye gaze tracking system generating a portion of at least one of said FE information and said body information.

17. The apparatus of claim 1, wherein said first signals are modified based on said FE information.

18. The apparatus of claim 1, wherein said first signals modify location of said OOI.

19. The apparatus of claim 1, wherein said first signals modify visual characteristics of said OOI.

20. The apparatus of claim 1, wherein said first signals cause a different object on said electronic device to be designated as said OOI.

21. The apparatus of claim 1, wherein said OOI is invisible to human eyes.

22. The apparatus of claim 1, wherein said processor generates second signals based on said FE information, wherein said second signals are distinct from said first signals.

23. The apparatus of claim 1, wherein said processor uses a different gain curve to generate said first signals based on a type of said first signals being generated.

24. The apparatus of claim 1, wherein said processor saves a portion of at least one of said FE information, said body information and information indicative of said first signals in said memory or on the electronic device.

25. The apparatus of claim 1, wherein said FE information is based on position of one or more facial muscles of the user.

26. The apparatus of claim 25, wherein said one or more facial muscles of the user comprises at least one of the muscles of the user's cheek.

27. The apparatus of claim 25, wherein said one or more facial muscles of the user comprises at least one of the muscles of the user's mouth.

28. The apparatus of claim 25, wherein said one or more facial muscles of the user comprises at least one muscle of the user's eye brow.

29. The apparatus of claim 25, wherein one or more facial muscles of the user comprises at least one muscle of the user's eye lid.

30. The apparatus of claim 1, wherein said apparatus further comprises at least one of a touch sensor, a proximity sensor, a pressure sensor, an EMG sensor, an ultrasonic sensor or a radar sensor that provides at least a portion of said FE information.

31. The apparatus of claim 1, wherein said one or more body parts of the user comprises the user's head.

32. The apparatus of claim 1, wherein said one or more body parts of the user comprises one or more of the user's eye balls.

33. The apparatus of claim 1, wherein said apparatus is included in the electronic device.

34. The apparatus of claim 1, wherein said processor suppresses generation of a first portion of said first signals for a first time duration starting immediately after said active facial expression is detected based on said FE information.

35. The apparatus of claim 34, wherein said processor suppresses or resumes generation of a second portion of said first signals based on a rate of change of said FE information.

36. A computer-implemented method for a user to communicate with an electronic device, said computer-implemented method comprising:
- receiving facial expression (FE) information indicative of one or more facial expressions performed by the user, wherein said FE information is provided by a FE sensor;
- receiving body information indicative of motion or position of one or more body parts of the user, said body information being distinct from said FE information and wherein said body information is provided by a motion sensor;
- generating first signals to modify an object of interest (OOI) on the electronic device when an active facial expression is detected based on said FE information, said first signals being based on said body information; and
- ending generation of said first signals when said active facial expression is no longer detected.

37. The computer-implemented method of claim 36, wherein said computer-implemented method further comprises generating selection signals when FE information crosses or reaches a third FE level.

38. The computer-implemented method of claim 37, wherein said selection signals comprise mouse signals.

39. The computer-implemented method of claim 36, wherein said first signals modify location of said OOI.

40. The computer-implemented method of claim 36, wherein said first signals modify visual characteristics of said OOI.

41. The computer-implemented method of claim 36, wherein said motion sensor comprises an image sensor.

42. The computer-implemented method of claim 36, wherein said motion sensor comprises an inertial motion sensor.

43. The computer-implemented method of claim 36, wherein said FE sensor comprises an image sensor.

44. The computer-implemented method of claim 36, wherein said FE sensor comprises a proximity sensor.

45. The computer-implemented method of claim 36, wherein said FE sensor comprises a touch sensor.

46. The computer-implemented method of claim 36, wherein said FE sensor comprises at least one of an EMG sensor, a pressure sensor, a strain sensor, a sonar sensor, an ultrasonic sensor and a radar sensor.

47. A non-transitory computer readable medium comprising one or more programs configured to be executed by one or more processors to enable a user to communicate with an electronic device, said one or more programs causing performance of a method comprising:
- receiving facial expression (FE) information indicative of one or more facial expressions performed by the user, said FE information being provided by a FE sensor;
- receiving body information indicative of motion or position of one or more body parts of the user, said body information being distinct from said FE information, said body information provided by a motion sensor;
- generating first signals to communicate with the electronic device when an active facial expression is detected based on said FE information, said first signals being based on said body information; and
- ending generation of said first signals when said active facial expression is no longer detected.

48. The non-transitory computer readable medium of claim 47, wherein said first signals modify an object of interest (OOI) on the electronic device.

49. The non-transitory computer readable medium of claim 48, wherein said first signals comprise one or more signals to modify the location of said OOI on the electronic device.

50. The non-transitory computer readable medium of claim 49, wherein said OOI comprises a graphical object on a display screen of the electronic device.

51. The non-transitory computer readable medium of claim 50, wherein said graphical object comprises a mouse pointer.

52. The non-transitory computer readable medium of claim 50, wherein said active facial expression is detected when said FE information reaches or crosses a first FE level.

53. The non-transitory computer readable medium of claim 48, wherein said first signals comprise one or more signals to modify the magnitude of said OOI on the electronic device.

54. The non-transitory computer readable medium of claim 48, wherein said first signals comprise one or more second signals, said one or more second signals configured to modify the selection state of said OOI on the electronic device.

55. The non-transitory computer readable medium of claim 54, wherein said one or more second signals comprise mouse button signals.

56. The non-transitory computer readable medium of claim 47, wherein said first signals comprise one or more signals for modification of an Object of Interest (OOI) on the electronic device.

57. The non-transitory computer readable medium of claim 56, wherein said OOI comprises a graphical object on a display screen of the electronic device.

58. The non-transitory computer readable medium of claim 57, wherein said active facial expression is detected when said FE information reaches or crosses a second FE level.

59. The non-transitory computer readable medium of claim 47, wherein said first signals comprise one or more signals for selection of an Object of Interest (OOI) on the electronic device.

60. The non-transitory computer readable medium of claim 47, wherein said first signals comprise one or more signals for a click and drag command on the electronic device.

* * * * *

UNITED STATES PATENT AND TRADEMARK OFFICE
CERTIFICATE OF CORRECTION

PATENT NO. : 9,785,242 B2  
APPLICATION NO. : 14/054789  
DATED : October 10, 2017  
INVENTOR(S) : Uday Parshionikar and Mihir Parshionikar Page 1 of 1

It is certified that error appears in the above-identified patent and that said Letters Patent is hereby corrected as shown below:

On the Title Page

Item (12), should read: Parshionikar et al.

Item (72) Inventors, should read:  
Uday Parshionikar, Mason, OH (US);  
Mihir Parshionikar, Seattle, WA (US)

Signed and Sealed this  
First Day of July, 2025

Coke Morgan Stewart  
*Acting Director of the United States Patent and Trademark Office*